United States Patent
Maruyama et al.

(10) Patent No.: US 12,292,529 B2
(45) Date of Patent: May 6, 2025

(54) ANTENNA DEVICE AND RADAR APPARATUS

(71) Applicant: Mitsubishi Electric Corporation, Tokyo (JP)

(72) Inventors: Takashi Maruyama, Tokyo (JP); Mitsuru Kirita, Tokyo (JP); Shigeo Udagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 782 days.

(21) Appl. No.: 17/311,350

(22) PCT Filed: Jun. 28, 2019

(86) PCT No.: PCT/JP2019/025989
§ 371 (c)(1),
(2) Date: Jun. 7, 2021

(87) PCT Pub. No.: WO2020/158009
PCT Pub. Date: Aug. 6, 2020

(65) Prior Publication Data
US 2022/0026524 A1    Jan. 27, 2022

(51) Int. Cl.
*G01S 7/03* (2006.01)
*G01S 13/44* (2006.01)
(Continued)

(52) U.S. Cl.
CPC .......... *G01S 7/032* (2013.01); *G01S 13/4463* (2013.01); *H01Q 1/32* (2013.01); *H01Q 1/3233* (2013.01);
(Continued)

(58) Field of Classification Search
CPC .. H01Q 21/06; H01Q 21/12; H05K 2201/037; H05K 2201/09985
See application file for complete search history.

(56) References Cited

U.S. PATENT DOCUMENTS

| | | | |
|---|---|---|---|
| 11,195,787 B2 * | 12/2021 | Huynh | H01Q 9/0407 |
| 2014/0340253 A1 | 11/2014 | Koerber et al. | |
| 2016/0285172 A1 | 9/2016 | Kishigami et al. | |
| 2017/0082730 A1 | 3/2017 | Kishigami et al. | |
| 2017/0236776 A1 | 8/2017 | Huynh et al. | |

(Continued)

FOREIGN PATENT DOCUMENTS

| | | |
|---|---|---|
| CN | 106546983 A | 3/2017 |
| CN | 110620297 A | 12/2019 |

(Continued)

OTHER PUBLICATIONS

International Search Report and Written Opinion mailed on Sep. 17, 2019, received for PCT Application PCT/JP2019/025989, Filed on Jun. 28, 2019, 10 pages including English Translation.

(Continued)

*Primary Examiner* — Dimary S Lopez Cruz
*Assistant Examiner* — Austin M Back
(74) *Attorney, Agent, or Firm* — XSENSUS LLP

(57) ABSTRACT

An antenna device includes a transmitting antenna including a transmission channel, a transmitting antenna including a transmission channel, a transmitting antenna including a transmission channel, a transmitting antenna including a transmission channel, and a receiving antenna including reception channels. An interval between the transmitting antenna and the transmitting antenna is wider than an overall width of the receiving antenna. An interval between the transmitting antenna and the transmitting antenna is narrower than an interval between adjacent channels among the reception channels.

14 Claims, 16 Drawing Sheets

(51) Int. Cl.
*H01Q 1/32* (2006.01)
*H01Q 3/24* (2006.01)
*H01Q 21/06* (2006.01)
*H01Q 21/12* (2006.01)

(52) U.S. Cl.
CPC ............... *H01Q 3/24* (2013.01); *H01Q 21/06* (2013.01); *H01Q 21/12* (2013.01)

(56) References Cited

U.S. PATENT DOCUMENTS

| | | | |
|---|---|---|---|
| 2018/0084637 A1* | 3/2018 | Ueda | H05K 1/0219 |
| 2018/0106895 A1 | 4/2018 | Koerber et al. | |
| 2018/0151961 A1* | 5/2018 | Lim | H01Q 21/065 |
| 2019/0067835 A1 | 2/2019 | Kishigami et al. | |
| 2019/0312331 A1* | 10/2019 | Sakurai | H01Q 1/38 |
| 2019/0391229 A1 | 12/2019 | Longman et al. | |
| 2020/0284901 A1 | 9/2020 | Tierney et al. | |
| 2020/0379083 A1 | 12/2020 | Lee | |
| 2021/0208265 A1 | 7/2021 | Lee | |

FOREIGN PATENT DOCUMENTS

| | | | |
|---|---|---|---|
| DE | 102017221043 A1 | 5/2018 | |
| EP | 2916144 A1 | 9/2015 | |
| JP | 2016-180720 A | 10/2016 | |
| JP | 2017-58359 A | 3/2017 | |
| JP | 2018-169208 A | 11/2018 | |
| WO | 2013/034281 A1 | 3/2013 | |
| WO | WO-2022106296 A2 * | 5/2022 | ........... H05K 1/0237 |

OTHER PUBLICATIONS

Li et al., "MIMO Radar with Colocated Antennas", IEEE Signal Processing Magazine, vol. 24, Issue 5, Sep. 2007, pp. 106-114.
US Office Action issued Jan. 11, 2024, in U.S. Appl. No. 17/417,125, 39 pages.
Office Action issued Jul. 5, 2022 in Australian Patent Application No. 2019426474, 4 pages.
Japanese Office Action date mailed Apr. 5, 2022, in Japanese Patent Application No. 2020-569278.
Office Action issued Jul. 18, 2023 in U.S. Appl. No. 17/417,125.
Office Action dated Dec. 26, 2023 for CN application No. 201980090329.2, 11 pages (with English machine translation).
Office Action dated Jun. 27, 2024 from the Chinese patent office in application No. 201980090329.2 with an English machine translation thereof.
Office Action issued on Dec. 10, 2024, in corresponding Chinese patent Application No. 201980090329.2, 16 pages.

* cited by examiner

ANTENNA DEVICE AND RADAR APPARATUS

CROSS-REFERENCE TO RELATED APPLICATIONS

The present application is based on PCT filing PCT/JP2019/025989, filed Jun. 28, 2019, which claims priority to PCT/JP2019/003384, filed Jan. 31, 2019, the entire contents of each are incorporated herein by reference.

FIELD

The present invention relates to a radar apparatus for detecting a target object (hereinafter referred to as a "target"), and an antenna device used in the radar apparatus.

BACKGROUND

In recent years, the development of a radar apparatus installed on a vehicle and used for detecting a target has been in progress. An example of the target is a vehicle traveling in front of a vehicle that is traveling and equipped with the radar apparatus. Another example of the target is an obstacle located in front of a vehicle that is traveling and equipped with the radar apparatus.

In a vehicle radar apparatus, typically, a transmitting antenna and a receiving antenna are provided separately and two or more channels are provided for the receiving antenna. A definition of the channel will be described later. The transmitting antenna radiates radio waves. The receiving antenna receives a reflected wave of the radio waves radiated from the transmitting antenna and reflected by the target. A signal processor of the vehicle radar apparatus calculates the distance from the vehicle to the target on the basis of the time from when the transmitting antenna radiates the radio waves to when the receiving antenna receives the reflected wave, or the frequency that varies with the distance to the target. The signal processor also calculates the speed of the target on the basis of a time-varying component of the distance to the target and calculates the orientation of the target, that is, the angle of the target, as seen from the vehicle on the basis of a phase difference of signals received by the plurality of reception channels. On the basis of the calculated distance, speed, and angle of the target, the vehicle radar apparatus prevents a collision with an obstacle and controls travel of the vehicle equipped with the radar apparatus.

Under the background technology as described above, Non-Patent Literature 1 below discloses a method of virtually expanding the antenna aperture by further providing two or more channels for the transmitting antenna. This method is known as multiple-input and multiple-output (hereinafter referred to as "MIMO") due to multiple channels provided for both transmission and reception. Hereinafter, a radar apparatus using the MIMO method will be referred to as a "MIMO radar", and an antenna device used in the MIMO radar will be referred to as a "MIMO antenna".

CITATION LIST

Non Patent Literature

Non Patent Literature 1: Jian Li and Petre Stoica, "MIMO Radar with Colocated Antennas", IEEE Signal Processing Magazine, Vol. 24, Issue 5, pp. 106-114, September 2007.

SUMMARY

Technical Problem

In general, the size of the antenna aperture is inversely proportional to the beamwidth of the antenna pattern. Therefore, the beamwidth of the antenna pattern can be decreased by increasing the antenna aperture. Also, the MIMO antenna can virtually increase the size of the antenna aperture and can thus decrease the beamwidth of the antenna pattern. Moreover, when the channel spacing of the receiving antenna is increased without changing the number of channels, the size of the antenna aperture can be increased and thus the beamwidth of the antenna pattern can be decreased.

On the other hand, the increase in the channel spacing of the receiving antenna causes a large number of unwanted radiations called grating lobes during beam scanning, which causes a problem of difficulty in identifying the angle of the target.

Moreover, when the horizontal angle and vertical angle of the target are measured with the receiving antenna, the reception channels need to be arranged in a planar manner, which causes problems of a significant increase in cost and complication of the device.

The present invention has been made in view of the above, and an object of the present invention is to provide an antenna device that can improve the angular resolution when observing a target, while preventing or reducing an increase in cost.

Solution to Problem

In order to solve the above problem and achieve the object, an antenna device according to the present invention includes a transmitting antenna including a plurality of transmission channels, and a receiving antenna including a plurality of reception channels. The transmitting antenna includes first, second, third, and fourth transmitting antennas. An interval between the first transmitting antenna and the second transmitting antenna is wider than the overall width of the receiving antenna. An interval between the third transmitting antenna and the fourth transmitting antenna is narrower than an interval between adjacent channels among the plurality of reception channels.

Advantageous Effects of Invention

The antenna device according to the present invention can improve the angular resolution when observing a target, while preventing or reducing an increase in cost.

DESCRIPTION OF EMBODIMENTS

An antenna device and a radar apparatus according to embodiments of the present invention will now be described in detail with reference to the drawings. Note that the present invention is not limited to the following embodiments.

First Embodiment

Figure 1:
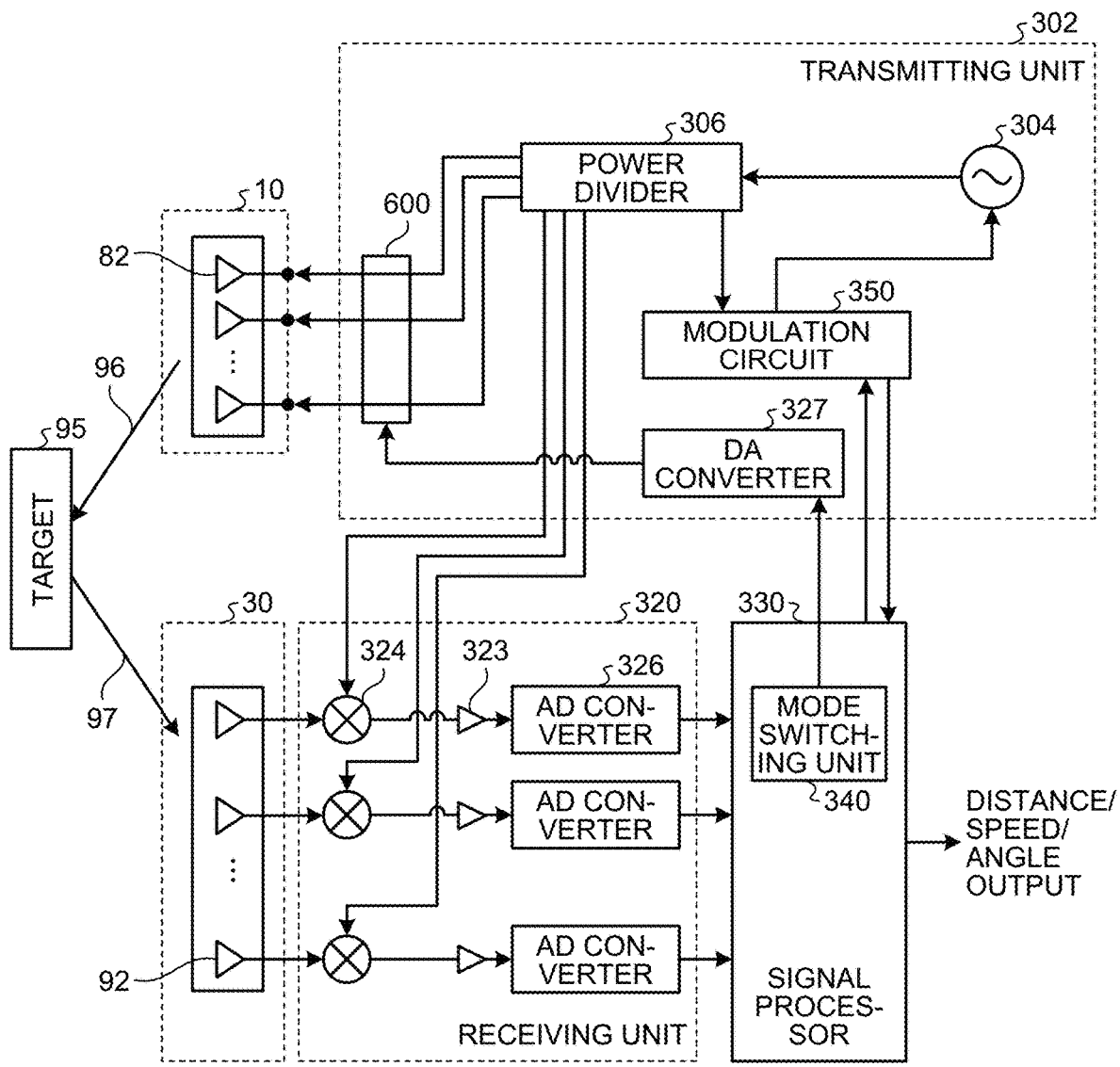
FIG. 1 is a diagram illustrating an example of a configuration of a radar apparatus including an antenna device according to a first embodiment.

FIG. 1 is a diagram illustrating an example of a configuration of a radar apparatus including an antenna device according to a first embodiment. In FIG. 1, a radar apparatus 300 includes a transmitting antenna 10, a transmission unit 302, a receiving antenna 30, a reception unit 320, and a signal processor 330.

The transmission unit 302 includes a voltage controlled oscillator 304, a power distributor 306, a high frequency transmission circuit 600, a digital-to-analog (hereinafter referred to as "DA") converter 327, and a modulation circuit 350.

The reception unit 320 includes a plurality of mixers 324, a plurality of baseband amplifiers 323, and a plurality of analog-to-digital (hereinafter referred to as "AD") converters 326.

Note that FIG. 1 illustrates a simplified diagram and omits the illustration of, for example, components such as a modulator, a multiplier, and an amplifier in the transmission unit 302 and components such as a filter and an amplifier in the reception unit 320. A low noise amplifier may be provided between the receiving antenna 30 and the mixers 324.

Note that although not shown, the modulation circuit 350 includes a reference signal oscillator, a DA converter, an AD converter, an amplifier, a mixer, a filter, a frequency divider, and the like. Moreover, the high frequency transmission circuit 600 includes a high power amplifier (an amplifier 132 described later), a phase shifter (a phase shifter 131 described later), and the like.

Furthermore, in FIG. 1, the transmitting antenna 10 includes a plurality of transmission channels each formed by one or more element antennas 82.

An output end for a local oscillator signal of the voltage controlled oscillator 304 is connected to an input end of the power distributor 306. The power distributor 306 distributes the power of the local oscillator signal of the voltage controlled oscillator 304 and outputs it to the high frequency transmission circuit 600. A plurality of output ends of the power distributor 306 are connected to corresponding input ends of the high frequency transmission circuit 600 and an input end of the modulation circuit 350. Output ends of the high frequency transmission circuit 600 are each connected to the transmitting antenna 10.

An output end for an oscillation signal of the modulation circuit 350 is connected to an input end for a control voltage of the voltage controlled oscillator 304. The input end for the local oscillator signal of the modulation circuit 350 is connected to the output end of the power distributor 306. The modulation circuit 350 is connected to the signal processor 330 to input and output signals.

An output end of the DA converter 327 is connected to the high frequency transmission circuit 600. An input end of the DA converter 327 is connected to the signal processor 330. The DA converter 327 converts transmission control information from the signal processor 330 into an analog transmission control signal and inputs it to the high frequency transmission circuit 600. The transmission control information includes phase control information and transmission output information, and the transmission control signal includes a phase control signal and an output control signal. Note that details of a transmission channel in the high frequency transmission circuit 600 will be described later in a fourth embodiment.

The modulation circuit 350 receives information on modulation parameters including frequency modulation width and modulation period from the signal processor 330, and generates a modulation signal based on the received modulation parameters in coordination with the voltage controlled oscillator 304. The voltage controlled oscillator 304 generates the modulation signal by changing the frequency of an output signal in response to a voltage change of the signal input from the modulation circuit 350. The modulation signal may be, for example, an FM-CW modulation signal or a high-speed modulation signal, the FM-CW modulation signal producing a chirp signal having a modulation frequency characteristic in which the frequency changes over time while repeating rising and falling in a linear manner, and the high-speed modulation signal producing a chirp signal with a modulation speed faster than FM-CW modulation.

The modulation circuit 350 may include a phase locked loop (PLL) circuit that stabilizes the modulation signal by synchronizing the phase when producing the modulation signal.

As disclosed in Japanese Patent No. 6351910 and Japanese Patent Application Laid-open No. 2018-185347, for example, the modulation circuit 350 adjusts a modulation control voltage for controlling the oscillation frequency of the local oscillator signal output by the voltage controlled oscillator 304 to a desired frequency on the basis of a generated signal oscillated by an internal oscillator and an oscillation control signal from the signal processor 330. The modulation circuit 350 inputs detected information of the local oscillator signal from the voltage controlled oscillator 304 to the signal processor 330. Note that details of the operation of the modulation circuit 350 will be omitted.

The high frequency transmission circuit 600 controls the phase of the phase shifter by the phase control signal and controls the output of the high power amplifier by the output control signal, on the basis of the transmission control signal generated from the signal processor 330. Note that these controls will be described later in the fourth embodiment.

The receiving antenna 30 forms an array antenna with a plurality of element antennas 92. The plurality of element antennas 92 are connected to corresponding ones of the mixers 324. The mixers 324 are connected to corresponding ones of the baseband amplifiers 323. The baseband amplifiers 323 are connected to corresponding ones of the AD converters 326. The output of the AD converters 326 at an output end of the reception unit 320 is input to the signal processor 330.

Next, the operation of the radar apparatus 300 illustrated in FIG. 1 will be described. First, the voltage controlled oscillator 304 generates a transmission signal on the basis of a modulation signal from a modulator (not shown). The transmission signal generated by the voltage controlled oscillator 304 is guided to the transmitting antenna 10 via the power distributor 306 and the high frequency transmission circuit 600, and is radiated into space from the transmitting antenna 10. A transmission wave 96 radiated into space is reflected by a target 95. A reflected wave 97 from the target 95 is received by the plurality of element antennas 92 of the receiving antenna 30.

A received signal at each of the element antennas 92 is output to the corresponding mixer 324 connected to the element antenna 92. Each of the mixers 324 generates a beat signal for the received signal output from the corresponding element antenna 92 by using the local oscillator signal that is supplied from the voltage controlled oscillator 304 via the power distributor 306. The beat signal is an analog signal. Each of the AD converters 326 converts the analog beat signal into a digital beat signal, and outputs the digital beat signal to the signal processor 330.

The signal processor 330 performs waveform shaping, signal correction processing such as temperature correction, frequency Fourier transform processing, and the like on each digital beat signal. The signal processor 330 further performs beam synthesis of the received beam and digital beamforming processing on the basis of each beat signal that has been processed, thereby calculating and outputting the distance, speed, and angle of the target 95. The signal processor 330 further includes a mode switching unit 340. Details of the mode switching unit 340 will be described later.

Figure 2:
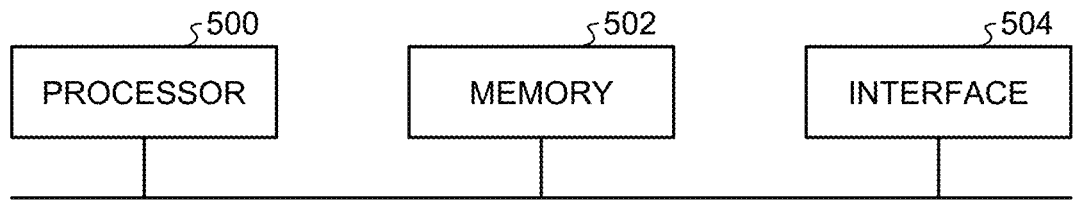
FIG. 2 is a diagram illustrating an example of a hardware configuration that implements the functions of a signal processor illustrated in FIG. 1.

All or part of the functions of the signal processor 330 illustrated in FIG. 1 can be implemented by, for example, a hardware configuration illustrated in FIG. 2. FIG. 2 is a diagram illustrating an example of the hardware configuration that implements the functions of the signal processor 330 illustrated in FIG. 1. The signal processor 330 can include a processor 500 that performs arithmetic operations, a memory 502 that stores programs and data read by the processor 500, and an interface 504 that inputs and outputs signals.

When the signal processor 330 illustrated in FIG. 1 is implemented by the configuration of FIG. 2, the signal processor 330 is implemented by, for example, the processor 500 illustrated in FIG. 2 executing the program stored in the memory 502. Note that a part of the functions of the signal processor 330 may be implemented as an electronic circuit, and the other part of the functions may be implemented by using the processor 500 and the memory 502.

The processor 500 may be arithmetic means such as an arithmetic unit, a microprocessor, a microcomputer, a central processing unit (CPU), or a digital signal processor (DSP). The memory 502 can include a non-volatile or volatile semiconductor memory such as a random access memory (RAM), a read only memory (ROM), a flash memory, an erasable programmable ROM (EPROM), or an electrically EPROM (EEPROM (registered trademark)).

The processor 500 can perform the above processing by transmitting and receiving necessary information via the interface 504 and executing the program stored in the memory 502. A result of arithmetic operation by the processor 500 can be stored in the memory 502.

Figure 3:
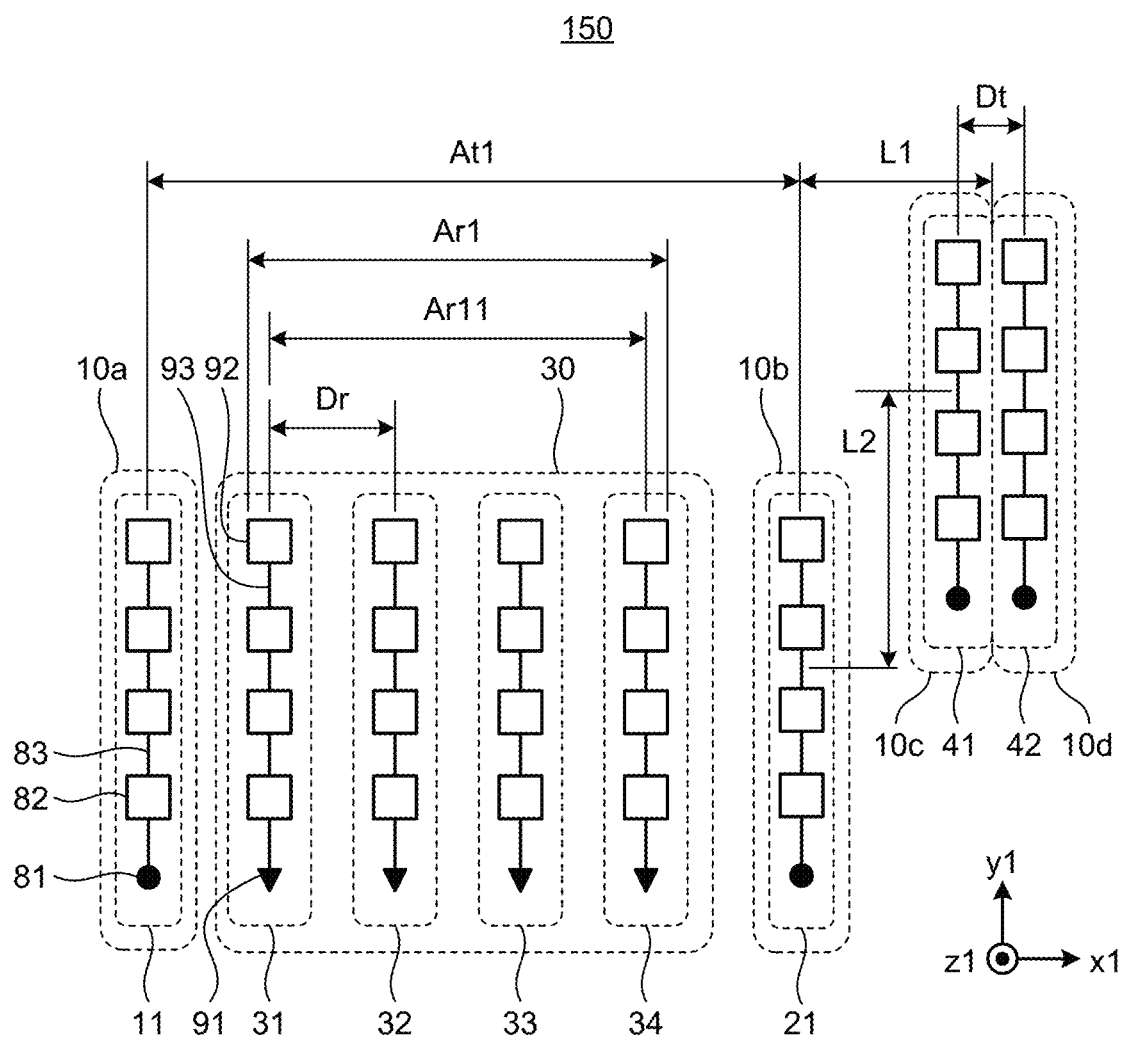
FIG. 3 is a diagram illustrating an example of the arrangement of element antennas in the antenna device according to the first embodiment.

The antenna device according to the first embodiment will now be described. FIG. 3 is a diagram illustrating an example of the arrangement of the element antennas in the antenna device according to the first embodiment. In FIG. 3, an antenna device 150 according to the first embodiment includes transmitting antennas 10a, 10b, 10c, and 10d and the receiving antenna 30. Note that in the following description, the transmitting antennas 10a, 10b, 10c, and 10d will be in some cases referred to as a "first transmitting antenna", a "second transmitting antenna", a "third transmitting antenna", and a "fourth transmitting antenna", respectively.

The transmitting antenna 10a includes a transmission channel 11. The transmission channel 11 includes a feeding point 81, the element antennas 82, and a line 83. The transmission channel 11 forms a sub-array antenna in which the plurality of element antennas 82 are connected to the feeding point 81 via the line 83 forming a distributed parameter line. An example of the line 83 is a conductor pattern. In the transmission channel 11, a high frequency signal applied to the feeding point 81 is radiated into space as a radio wave from each of the element antennas 82 being a component of the sub-array antenna.

The line 83 connects the feeding point 81 and the element antenna 82 as well as the element antennas 82 adjacent to each other. In FIG. 3, the feeding point 81 means an electrical connection point between an integrated circuit (hereinafter referred to as "IC"), which is not shown and outputs the high frequency signal, and the line 83. Here, one processing unit that puts together the element antennas 82 connected to the feeding point 81 and the line 83 is defined as the "transmission channel".

An example of the element antenna 82 is a rectangular patch antenna as illustrated in FIG. 3. The patch antenna can be implemented by forming a radiating element with a conductor on one side of a dielectric substrate and using a back side thereof as a ground plane, that is, a ground conductor. FIG. 3 omits the illustration of the dielectric substrate and the ground plane. Note that the element antenna 82 does not necessarily have to be a patch antenna, and may be any antenna as long as it has the radiating function. Also, in FIG. 3, the number of the element antennas 82 included in one transmission channel 11 is four, but any number of elements such as one element may be included.

The transmitting antenna 10b includes one transmission channel 21, the transmitting antenna 10c includes one transmission channel 41, and the transmitting antenna 10d includes one transmission channel 42. In FIG. 3, the configurations of the transmission channels 21, 41, and 42 are similar to that of the transmission channel 11. The transmission channels 21, 41, and 42 each form a sub-array antenna in which the plurality of element antennas 82 are connected to the feeding point 81 via the line 83. Note that the number of the element antennas in each transmission channel may vary among the transmission channels, but the number of the element antennas in the transmitting antenna 10a and the number of the element antennas in the transmitting antenna 10b are preferably the same, and the number of the element antennas in the transmitting antenna 10c and the number of the element antennas in the transmitting antenna 10d are preferably the same.

The receiving antenna 30 includes reception channels 31, 32, 33, and 34 (hereinafter referred to as "31 to 34"). Each reception channel in the receiving antenna 30 includes a receiving point 91, the element antennas 92, and a line 93, and forms a sub-array antenna in which the plurality of element antennas 92 are connected to the receiving point 91 via the line 93 forming a distributed parameter line. Each reception channel forming the sub-array antenna receives the reflected wave 97 reflected by the target 95 at the element antennas 92, and supplies a high frequency signal of the reflected wave 97 received to the receiving point 91.

The line 93 connects the receiving point 91 and the element antenna 92 as well as the element antennas 92 adjacent to each other. The receiving point 91 means an electrical connection point between an IC (not shown in FIG. 3) that inputs the high frequency signal and the line 93. Here, one processing unit that puts together the element antennas 92 connected to the receiving point 91 and the line 93 is defined as the reception channel.

In a similar manner to the transmission channel 11, an example of the element antenna 92 is a rectangular patch antenna as illustrated in FIG. 3. Note that the element antenna 92 does not necessarily have to be a patch antenna, and may be any antenna as long as it has the receiving function. Also, in FIG. 3, the number of the element antennas 92 included in one reception channel 31 is four, but any number of elements such as one element may be included.

Moreover, in FIG. 3, the configurations of the reception channels 32, 33, and 34 are similar to that of the reception channel 31. Furthermore, the number of the reception channels is four in FIG. 3, but any number of two or more can be set as the number of the reception channels.

Next, the positional relationship between the transmitting antennas 10a, 10b, 10c, and 10d and the receiving antenna 30 in the antenna device 150 according to the first embodiment will be described.

First, in the receiving antenna 30, four of the reception channels 31 to 34 are arranged along an x1 direction that is a first direction. The first direction corresponds to a horizontal direction. Moreover, in the receiving antenna 30, four of the element antennas 92 included in each of the reception channels are arranged in a y1 direction that is a second direction. The second direction is orthogonal to the first direction and is perpendicular to the ground. Furthermore, a positive or negative z1 direction, which is a third direction, corresponds to the direction of arrival of a received radio wave arriving at the receiving antenna 30 head-on. The third direction is a direction perpendicular to each of the first direction and the second direction.

As described above, the receiving antenna 30 of the first embodiment forms one reception channel with the four element antennas 92 arranged in the y1 direction, and forms a linear array in the x1 direction with the four reception channels 31 to 34 arranged in the x1 direction.

In the receiving antenna 30, the four reception channels 31 to 34 are arranged at equal intervals. In FIG. 3, the interval between adjacent channels among the reception channels 31 to 34 is indicated by "Dr", and the overall width of the receiving antenna 30 is indicated by "Ar1". However, "Ar1" is to be defined as the aperture width of the reception channels that can contribute to reception, and corresponds to the width between left ends of the element antennas 92 in the reception channel 31 located on the left side of the drawing, that is, one side of the receiving antenna 30, and right ends of the element antennas 92 in the reception channel 34 located on the right side of the drawing, that is, another side of the receiving antenna 30. Moreover, "Ar11" indicates the interval between the phase center of the element antennas 92 in the reception channel 31 and the phase center of the element antennas 92 in the reception channel 34. That is, the interval "Ar11" is the practical aperture width of the receiving antenna 30 including the four reception channels 31 to 34.

Moreover, the transmitting antenna 10a and the transmitting antenna 10b are arranged at an interval wider than the overall width "Ar1" of the receiving antenna 30. In FIG. 3, this interval is indicated by "At1". Furthermore, the transmitting antenna 10c and the transmitting antenna 10d are arranged at an interval narrower than the interval "Dr" between the adjacent channels among the reception channels 31 to 34. Note that in FIG. 3, the interval between the transmitting antenna 10b and the transmitting antenna 10c is indicated by "L1", and the interval between the phase center of the transmitting antenna 10b and the phase center of the transmitting antenna 10c is indicated by "L2", but these "L1" and "L2" can take any values without departing from the scope of the antenna device of the present embodiment.

When the above relationships are put in order, the interval "At1" between the transmitting antenna 10a and the transmitting antenna 10b, the overall width "Ar1" of the receiving antenna 30, the interval "Dr" between the adjacent channels among the reception channels 31 to 34, and the interval "Dt" between the transmitting antenna 10c and the transmitting antenna 10d satisfy the following expression.

$$At1 > Ar1 > Dr > Dt \tag{1}$$

Next, the operation of the antenna device 150 according to the first embodiment will be described.

First, the antenna device 150 according to the first embodiment operates in roughly two operation modes. One of the operation modes is a "MIMO operation mode" in which the antenna device operates as a MIMO antenna. The other one of the operation modes is a "phased array operation mode" in which the antenna device operates as a phased array antenna.

In the MIMO operation mode, radio waves of a plurality of signals orthogonal to each other are radiated from at least two of the transmission channels in the transmitting antennas 10a, 10b, 10c, and 10d, and a received signal received via the receiving antenna 30 is demodulated, separated, and subjected to weighted synthesis by digital processing. Techniques for generating a plurality of signals orthogonal to each other include a method that uses code modulation for a transmission signal, a method that changes the carrier frequency for each transmitting antenna, a time division method that changes the transmission timing for each transmitting antenna, a method that applies phase modulation for each pulse of radar transmission, and the like. Hereinafter, the operation of the antenna device according to the present embodiment operating as the MIMO antenna is referred to as a "MIMO operation".

In the phased array operation mode, radio waves of a single signal are simultaneously radiated into space from at least two of the transmission channels in the transmitting antennas 10a, 10b, 10c, and 10d, and a received signal received via the receiving antenna 30 is subjected to phase adjustment by the phase shifter (not shown in FIG. 1 or 3) or signal processing of the signal processor 330, followed by beam synthesis. Note that when the transmission signal is radiated into space as a radio wave, the phase shifter sometimes controls the direction of radiation of the radio wave, that is, performs beam control of the antenna pattern. Hereinafter, the operation of the antenna device according to the present embodiment operating as an antenna device for a phased array radar is referred to as a "phased array operation".

The MIMO operation mode includes two more operation modes. One of the two operation modes is a "high resolution mode" in which the angular range observable by the antenna device is relatively narrow, but the angular resolution available is relatively high. The other one of the two operation modes is a "wide angle mode" in which the angular resolution available by the antenna device is relatively low, but the angular range observable is relatively wide. Note that in the following description, the high resolution mode will be referred to as a "first operation mode" in some cases, and the wide angle mode will be referred to as a "second operation mode" in some cases. In addition, the phased array operation mode will be referred to as a "third operation mode" in some cases.

The mode switching unit 340 selects either the high resolution mode or the wide angle mode according to a preset control sequence or a mode control signal (not shown) from the outside, generates transmission control information corresponding to the selected operation mode, and outputs the information to the DA converter 327. In response to the selection by the mode switching unit 340, the signal processor 330 performs received signal processing corresponding to the selected operation mode. The signal processor 330 also forms a received beam using the received signal from the AD converters 326 based on the received signal at the receiving antenna 30, and performs arithmetic processing of distance, speed, and angle estimation processing for the target 95.

In the present description, the high resolution mode and the wide angle mode will be described below in detail. Note that the antenna device 150 of the first embodiment uses a known technique for the phased array operation, and detailed description thereof will be omitted here.

First, the high resolution mode will be described. The high resolution mode uses the transmission channels 11 and 21 and the reception channels 31 to 34 on the basis of transmission control information and received signal processing corresponding to the high resolution mode.

In the transmission channel 11 of FIG. 3, when a high frequency signal is applied to the feeding point 81, the transmission wave 96 is radiated from the element antennas 82. The transmission channel 21 of FIG. 3 also operates similarly. Hereinafter, the case where the transmission wave 96 is radiated from the element antennas connected to a certain transmission channel will be simply described as "the radio wave is radiated from the transmission channel", in order to simplify the explanation. Similarly, the case where the reflected wave 97 is received by the element antennas connected to a certain reception channel will be simply described as "the radio wave is received by the reception channel", in order to simplify the explanation.

The transmission wave 96 radiated from the transmission channels 11 and 21 is reflected by the target 95, and the reflected wave 97 from the target 95 is received by the receiving antenna 30. In the reception channel 31, the high frequency signal received by the element antennas 92 is input to the receiving point 91. The reception channels 32, 33, and 34 also operate similarly.

The radiation of the radio wave from the transmission channel 11 and the radiation of the radio wave from the transmission channel 21 follow a control sequence preset by the mode switching unit 340 or a mode control signal from the outside (not shown), and are switched alternately by time division in every frequency chirp period for each channel. The transmission channel 11 and the transmission channel 21 use the frequency chirps having the same waveform.

Note that the transmission channels 11 and 21 and the reception channels 31 to 34 may be operated by frequency division or orthogonal code division by appropriately configuring the voltage controlled oscillator 304, the mixer 324, and the power distributor 306.

The high frequency signal obtained at the receiving point 91 is input to the mixer 324, subjected to frequency conversion by the mixer 324, and then converted into a digital signal by the AD converter 326. Then, the signal processor 330 performs arithmetic processing for estimating the distance, speed, and angle of the target 95. Note that the antenna device of the present embodiment uses a known technique for estimating the distance and speed of the target 95, and detailed description thereof will be omitted here.

Next, the estimation of the angle of the target 95 as the received signal processing in the high resolution mode will be described. First, the high frequency signals obtained in the reception channels 31 to 34 vary in phase depending on the angle of the target 95. Therefore, the angle of the target 95 can be estimated on the basis of the phase variation of the high frequency signals. An algorithm such as MUltiple SIgnal Classification (MUSIC) is used in some cases to estimate the angle of the target 95, but for the sake of simplicity, the description here uses an estimation method based on beam scanning.

The signal processor 330 performs, for a plurality of angles, an operation in which the high frequency signals obtained in the reception channels 31 to 34 or signals obtained by digitizing these signals are multiplied by a weight and added up, the weight having a phase adjusted to allow the signals to intensify each other at a specific angle. As a result, a strong signal can be obtained from the angle at which the target is located, so that the angle of the target can be estimated.

As described above, the high resolution mode includes the operation of radiating the radio wave from the transmission channel 11 and receiving the radio wave on the reception channels 31 to 34 and the operation of radiating the radio wave from the transmission channel 21 and receiving the radio wave on the reception channels 31 to 34. Since the positions of the transmission channel 11 and the transmission channel 21 are different, the phases of the radio waves received by the reception channels 31 to 34 also vary. This enables the MIMO operation using multiple channels for transmission and reception.

Figure 4:
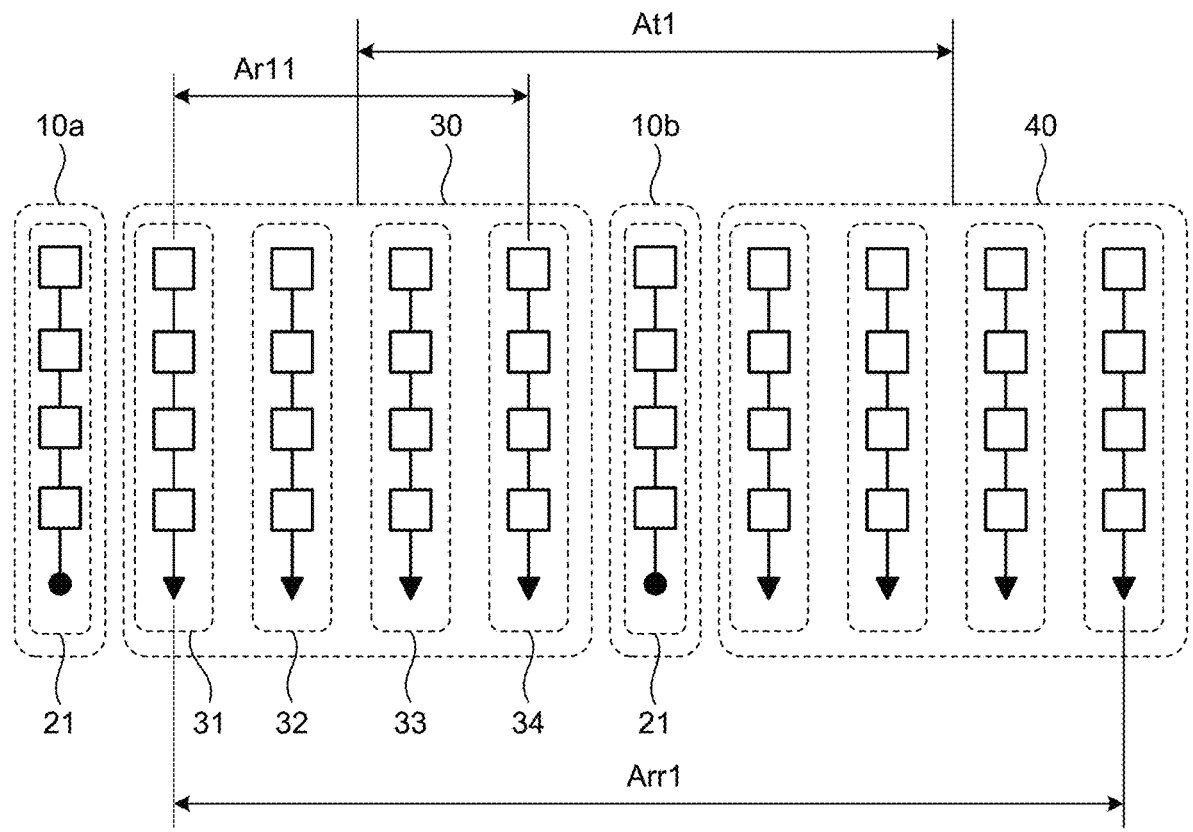
FIG. 4 is a diagram illustrating an equivalent antenna configuration of the antenna device according to the first embodiment in a high resolution mode.
Figure 5:
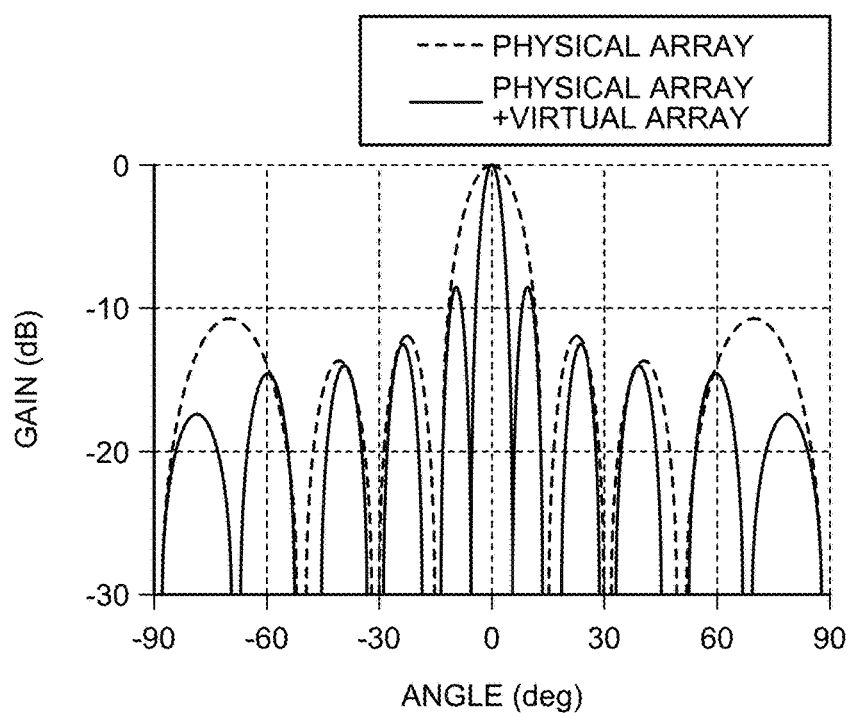
FIG. 5 is a graph illustrating an example of a receiving antenna pattern within a horizontal plane of the antenna device according to the first embodiment in the high resolution mode.

Next, an effect of the high resolution mode in the first embodiment will be described with reference to FIGS. 4 and 5 in addition to the above drawings. FIG. 4 is a diagram illustrating an equivalent antenna configuration of the antenna device according to the first embodiment in the high resolution mode. FIG. 5 is a graph illustrating an example of a receiving antenna pattern within a horizontal plane of the antenna device according to the first embodiment in the high resolution mode. The horizontal plane is a plane orthogonal to the y1 direction that is the second direction illustrated in FIG. 3.

As described above, one of the characteristics of the antenna device 150 of the first embodiment is that the interval "At1" between the transmission channel 11 and the transmission channel 21 is wider than the overall width "Ar1" of the receiving antenna 30. This can obtain a received signal equivalent to a case where the receiving antenna 30 and a receiving antenna 40 are arranged at the interval "At1" as in FIG. 4. The receiving antenna 40 is a virtual receiving antenna for explaining the receiving phase input to the signal processor 330. On the basis of the case where the radio wave is radiated from the transmission channel 11 and received by the receiving antenna 30, when the radio wave is radiated from the transmission channel 21 and received by the receiving antenna 30, a phase equivalent to that received by the virtual receiving antenna at the position of the receiving antenna 40 illustrated in FIG. 4 can be obtained. That is, an equivalent aperture width "Arr1" of the receiving antenna of the antenna device 150 is approximately twice the practical aperture width "Ar11" of the receiving antenna 30.

FIG. 5 illustrates an example of the receiving antenna pattern within the horizontal plane of the antenna device 150. The horizontal axis represents the angle (deg), the vertical axis represents the gain, and the gain is expressed in decibels (dB). Also, in FIG. 5, the broken line represents the receiving antenna pattern in the case of the receiving antenna 30 alone. This indicates the performance of the receiving antenna when only the transmission channel 11 or only the transmission channel 21 is used. Moreover, the solid line represents the receiving antenna pattern in the case where both the transmission channel 11 and the transmission channel 21 are used, and the antenna device 150 performs the MIMO operation. This indicates the receiving antenna pattern in which the receiving antenna 30 and the receiving antenna 40 as the virtual receiving antenna are combined in FIG. 4, and since the virtual receiving antenna is included, the receiving antenna pattern can be said to be one including a physical array and a virtual array. On the other hand, the broken line represents the receiving antenna pattern in the case of the receiving antenna 30 alone, and the receiving antenna pattern can be said to be one including only the physical array.

As illustrated in FIG. 5, in the receiving antenna pattern including the physical array and the virtual array, a narrow beamwidth is obtained as compared with the receiving antenna pattern including only the physical array. This is because in the former, the equivalent aperture width of the receiving antenna is increased.

As described above, according to the antenna device of the first embodiment, the high resolution mode uses the pair of the first transmitting antenna and the second transmitting antenna whose interval therebetween is wider than the overall width of the receiving antenna, and causes the antenna device to perform the MIMO operation. As a result, the antenna aperture is virtually enlarged to be able to narrow the beamwidth. This can improve the angular resolution when observing a target.

Next, the wide angle mode will be described. The wide angle mode uses the transmission channels 41 and 42 and the reception channels 31 to 34 on the basis of transmission control information and received signal processing corresponding to the wide angle mode.

In FIG. 3, the radio wave is radiated from the transmission channel 41. The radio wave radiated from the transmission channel 41 is reflected by the target 95 and received by the receiving antenna 30. The radio wave is also radiated from the transmission channel 42. The radio wave radiated from the transmission channel 42 is reflected by the target 95 and received by the receiving antenna 30.

The radiation of the radio wave from the transmission channel 41 and the radiation of the radio wave from the transmission channel 42 follow a control sequence preset by the mode switching unit 340 or a mode control signal from the outside (not shown), and are switched alternately by time division in every frequency chirp period for each channel. The transmission channel 41 and the transmission channel 42 use the frequency chirps having the same waveform.

The frequency chirp periods for the transmission channel 41 and the transmission channel 42 and the frequency chirp periods for the transmission channel 11 and the transmission channel 21 are different periods, that is, different timings. Note that the transmission channels 41 and 42 and the reception channels 31 to 34 may be operated by frequency division or orthogonal code division by appropriately configuring the voltage controlled oscillator 304, the mixer 324, and the power distributor 306.

Note that the operation of the reception channels 31 to 34 in the receiving antenna 30 and the arithmetic processing for estimating the distance and speed of the target 95 in the signal processor 330 are the same as those described in the high resolution mode, and will not be described here.

Next, the estimation of the angle of the target 95 as the received signal processing in the wide angle mode will be described. First, the high frequency signals obtained in the reception channels 31 to 34 vary in phase depending on the angle of the target 95. Therefore, as with the high resolution mode, the angle of the target 95 can be estimated on the basis of the phase variation of the high frequency signals.

As with the high resolution mode, the wide angle mode also includes the operation of radiating the radio wave from the transmission channel 41 and receiving the radio wave on the reception channels 31 to 34 and the operation of radiating the radio wave from the transmission channel 42 and receiving the radio wave on the reception channels 31 to 34. Since the positions of the transmission channel 41 and the transmission channel 42 are different, the phases of the radio waves received by the reception channels 31 to 34 also vary. This enables the MIMO operation using multiple channels for transmission and reception.

A characteristic of the wide angle mode in the first embodiment is that the interval "Dt" between the transmission channel 41 and the transmission channel 42 is narrower than the interval "Dr" between the adjacent reception channels in the receiving antenna 30. Also, FIG. 3 illustrates that the interval "Dt" between the transmission channel 41 and the transmission channel 42 and the interval "Dr" between the adjacent reception channels satisfy a relationship of Dt=Dr/2. Note that the relationship of Dt=Dr/2 is an example, and any relationship satisfying Dt<Dr is included in the scope of the first embodiment.

Figure 6:
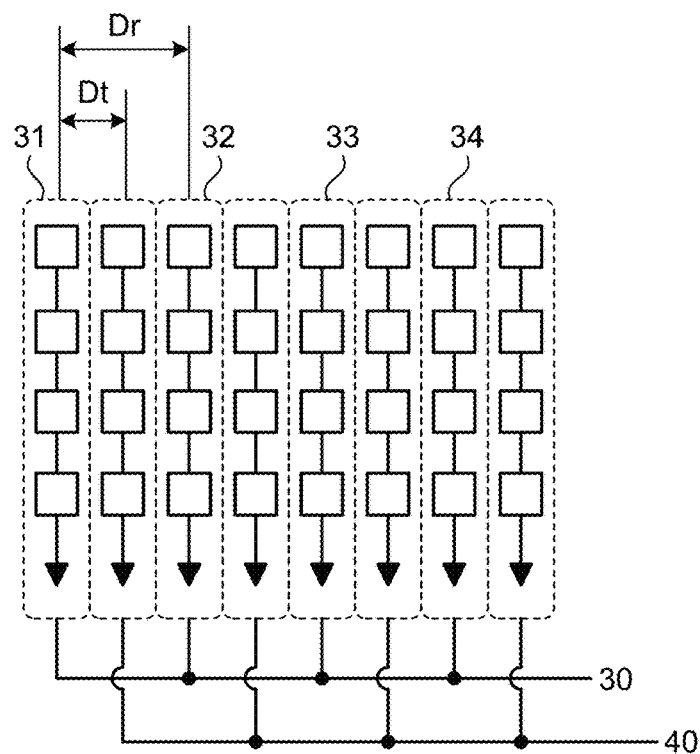
FIG. 6 is a diagram illustrating an equivalent antenna configuration of the antenna device according to the first embodiment in a wide angle mode.

FIG. 6 is a diagram illustrating an equivalent antenna configuration of the antenna device 150 according to the first embodiment in the wide angle mode. On the basis of the case where the radio wave is radiated from the transmission channel 41 and received by the receiving antenna 30, when the radio wave is radiated from the transmission channel 42 and received by the receiving antenna 30, the received signal having a phase equivalent to that received by the antenna at the position of the receiving antenna 40 illustrated in FIG. 6 can be obtained. Moreover, as described above, in the example of FIG. 3, the interval "Dt" between the transmission channel 41 and the transmission channel 42 and the interval "Dr" between the adjacent reception channel satisfy the relationship of Dr>Dt. Therefore, as illustrated in FIG. 6, the wide angle mode has the antenna configuration in which the entire reception channels 31 to 34 are grouped together and shifted to the right by "Dt" in the drawing. As a result, the receiving antenna 30 and the receiving antenna 40 are arranged so as to be offset by the interval "Dt", and the reception channels included in the receiving antenna 30 and the reception channels included in the receiving antenna 40 are alternately arranged. Note that since the interval "Dr" and the interval "Dt" are set to satisfy the relationship of Dt=Dr/2, a virtual reception channel is arranged at a middle position between the adjacent reception channels as illustrated in FIG. 6.

Figure 7:
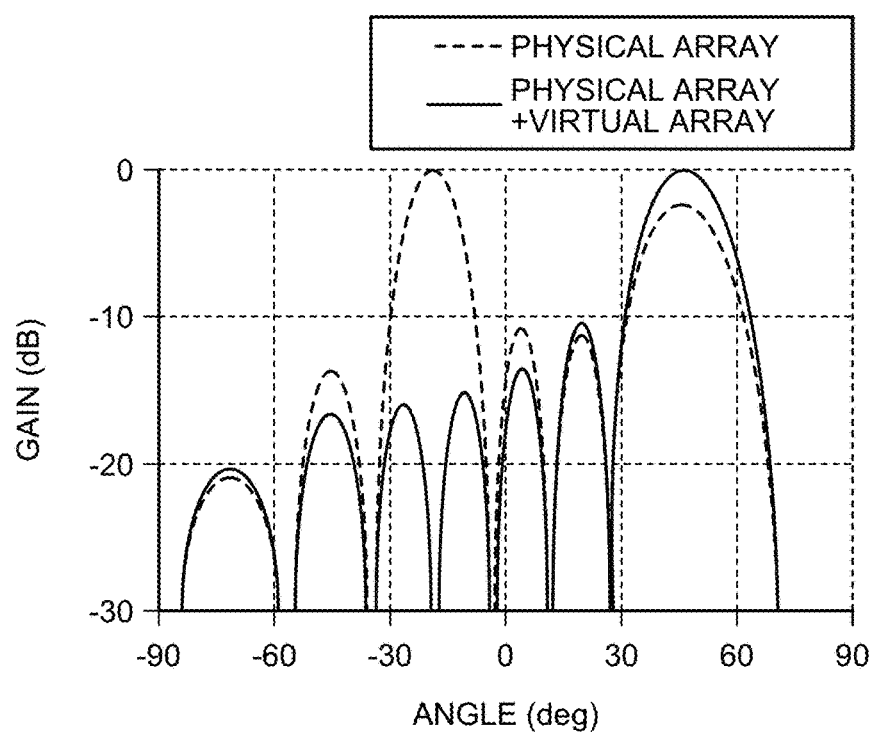
FIG. 7 is a graph illustrating an example of a receiving antenna pattern within a horizontal plane of the antenna device according to the first embodiment in the wide angle mode.

FIG. 7 is a graph illustrating an example of the receiving antenna pattern within the horizontal plane of the antenna device 150 according to the first embodiment in the wide angle mode. The horizontal axis represents the angle (deg), the vertical axis represents the gain, and the gain is expressed in decibels (dB). Also, in FIG. 7, the broken line represents the receiving antenna pattern in the case of the receiving antenna 30 alone. This indicates the performance of the receiving antenna when only the transmission channel 41 or only the transmission channel 42 is used. Moreover, the solid line represents the receiving antenna pattern in the case where both the transmission channels 41 and 42 are used, and the antenna device 150 performs the MIMO operation. This indicates the receiving antenna pattern in which the receiving antenna 30 and the receiving antenna 40 as the virtual receiving antenna are combined in FIG. 6, and the receiving antenna pattern can be said to be one including the physical array and the virtual array, as in the case of FIG. 5. On the other hand, the broken line represents the receiving antenna pattern in the case of the receiving antenna 30 alone, and the receiving antenna pattern can be said to be one including only the physical array, as in the case of FIG. 5. Note that for both the solid line and the broken line in FIG. 7, the main beam of the antenna is directed in the direction of 45 (deg) to the right in the horizontal plane.

In general, the narrower the channel spacing is, the less likely the receiving antenna pattern of the antenna device is to have a grating lobe that causes unwanted radiation. In the broken line of FIG. 7, the grating lobe is generated in the direction of approximately −20 degrees due to the wide channel spacing. In the case of this example, it is difficult to distinguish the target 95 in the direction of 45 degrees from the target 95 in the direction of −20 degrees. On the other hand, in the solid line of FIG. 7, no grating lobe is generated because the channel spacing is narrow due to the MIMO operation.

As described above, according to the antenna device of the first embodiment, the wide angle mode uses the pair of the third transmitting antenna and the fourth transmitting antenna whose interval therebetween is narrower than the interval between the adjacent reception channels of the receiving antenna, and causes the antenna device to perform the MIMO operation. As a result, the real receiving antenna and the virtual receiving antenna can be arranged densely with the interval therebetween narrower than the interval between the adjacent reception channels of the real receiving antenna. This can expand the angular range observable while suppressing unwanted grating lobes at the time of observing a target.

Moreover, according to the antenna device of the first embodiment, the receiving antenna can be shared between the wide angle mode and the high resolution mode by changing the transmission channels used between the wide angle mode and the high resolution mode. As a result, the wide angle mode can be implemented without providing a reception channel specific to the wide angle mode. This can achieve both higher resolution and wider angle in estimating the angle of a target while preventing or reducing an increase in cost. Moreover, since the receiving antenna can be shared, the radar apparatus can be more simplified while keeping down the size of the apparatus.

Second Embodiment

Figure 8:
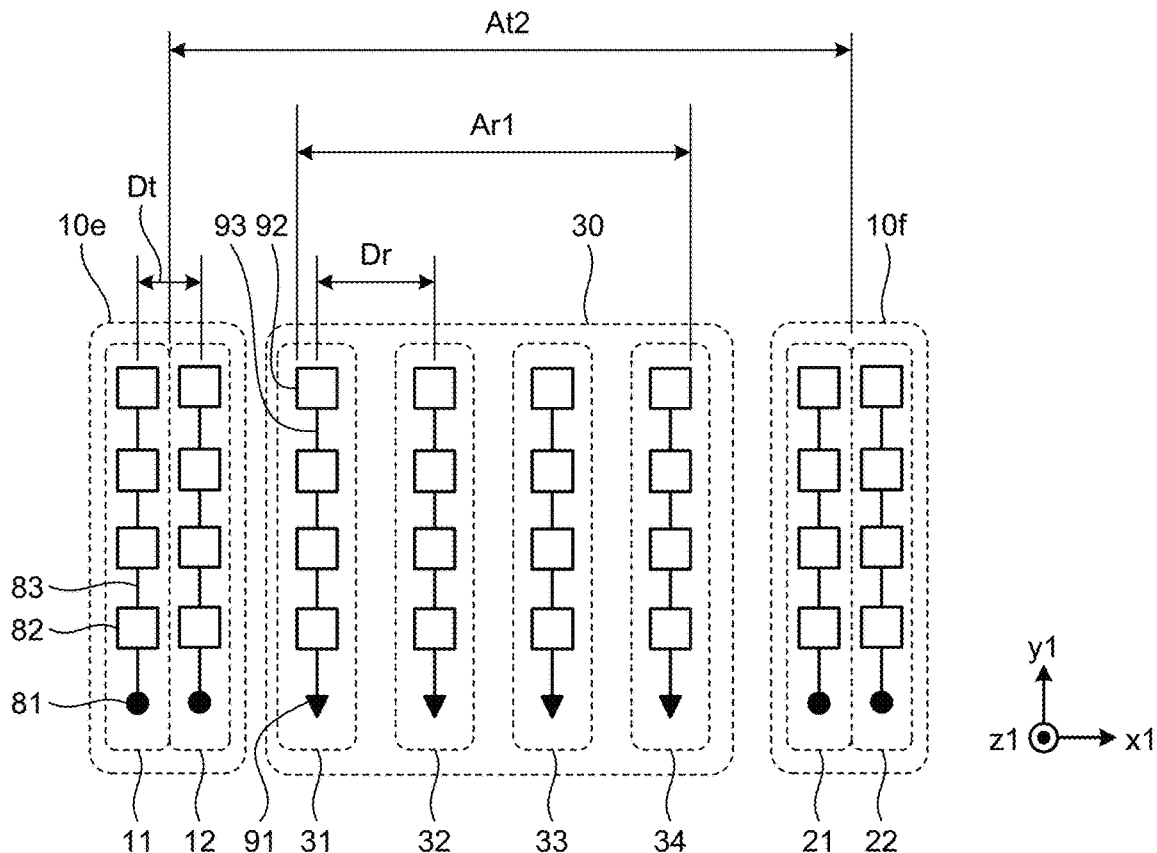
FIG. 8 is a diagram illustrating an example of the arrangement of element antennas in an antenna device according to a second embodiment.

FIG. 8 is a diagram illustrating an example of the arrangement of element antennas in an antenna device according to a second embodiment. An antenna device 150A according to the second embodiment in FIG. 8 is obtained by replacing, with transmitting antennas 10e and 10f, the transmitting antennas 10a and 10b and removing the transmitting antennas 10c and 10d of the antenna device 150 according to the first embodiment illustrated in FIG. 3. Moreover, the transmitting antenna 10e is provided with two transmission channels being the transmission channel 11 and a transmission channel 12, and the transmitting antenna 10f is provided with two transmission channels being the transmission channel 21 and a transmission channel 22. Note that the other configurations are identical or equivalent to those of the first embodiment and are thus denoted by the same reference numerals as those in the first embodiment, whereby a redundant description will be omitted. Moreover, in the following description, the transmission channels 11, 12, 21, and 22 will be in some cases referred to as a "first transmission channel", a "second transmission channel", a "third transmission channel", and a "fourth transmission channel", respectively.

An additional description will be made of the configuration in FIG. 8. In FIG. 8, the transmitting antenna 10e and the transmitting antenna 10f are arranged at the interval wider than the overall width "Ar1" of the receiving antenna 30, as in the first embodiment. However, since the configurations of the transmitting antennas 10e and 10f are different from those of the first embodiment, the interval is indicated by "At2" in FIG. 8. In the case of the two transmission channels as in the example of FIG. 8, the interval "At2" corresponds to the distance between the midpoint of the transmission channels 11 and 12 and the midpoint of the transmission channels 21 and 22. In a case of three or more transmission channels, the transmission channels in each of the transmitting antennas 10e and 10f transmit the same radio wave at the same time, so that the interval "At2" corresponds to the distance between the phase center of the transmitting antenna 10e and the phase center of the transmitting antenna 10f.

Next, the operation of the antenna device 150A according to the second embodiment will be described. As with the antenna device 150 according to the first embodiment, the antenna device 150A according to the second embodiment includes two operation modes, i.e., the high resolution mode and the wide angle mode.

First, the high resolution mode in the second embodiment will be described. The high resolution mode uses the transmission channels 11, 12, 21, and 22 and the reception channels 31 to 34.

In the antenna device 150A according to the second embodiment, radio waves are radiated from the plurality of transmission channels arranged in the x1 direction that is the horizontal direction. Specifically, in the configuration of FIG. 8, radio waves are simultaneously radiated from the transmission channels 11 and 12, and radio waves are simultaneously radiated from the transmission channels 21 and 22. As a result, the beamwidth of the radiation pattern can be narrowed as compared with a case where the radio wave is radiated from only the transmission channel 11 or only the transmission channel 12.

Figure 9:
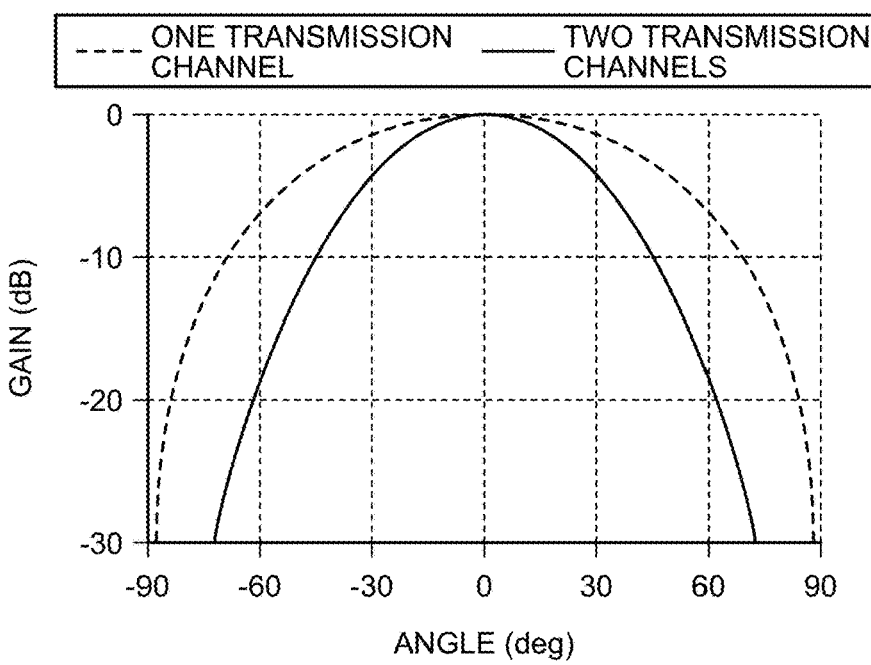
FIG. 9 is a graph illustrating an example of a transmitting antenna pattern within a horizontal plane of the antenna device according to the second embodiment in the high resolution mode.

FIG. 9 is a graph illustrating an example of a transmitting antenna pattern within the horizontal plane of the antenna device according to the second embodiment in the high resolution mode. The transmitting antenna pattern is synonymous with the radiation pattern. The horizontal axis represents the angle (deg), the vertical axis represents the gain, and the gain is expressed in decibels (dB). In FIG. 9, the broken line represents the transmitting antenna pattern when one transmission channel such as the transmission channel 11 is used alone. Moreover, the solid line represents the transmitting antenna pattern when two transmission channels such as the transmission channels 11 and 12 are used at the same time. It can be seen that in the latter, the antenna beam can be narrowed around the front as compared with the former, and the power can be concentrated in a desired direction of observation.

The radio waves radiated from the transmission channels 11 and 12 are reflected by the target 95 and received by the reception channels 31 to 34 of the receiving antenna 30. The radio waves radiated from the transmission channels 21 and 22 are also reflected by the target 95 and received by the reception channels 31 to 34 of the receiving antenna 30. The signal processor 330 of the radar apparatus 300 performs signal processing for estimating the distance, speed, and angle of the target 95 on the basis of a digitized signal of the high frequency signal obtained at the receiving point 91. Note that as described above, since a known technique is used for estimating the distance and speed of the target 95, the description thereof will be omitted here.

Next, the estimation of the angle of the target 95 during the high resolution mode in the second embodiment will be described. The high resolution mode of the second embodiment includes the operation of radiating the radio waves from the transmission channels 11 and 12 of the transmitting antenna 10e and receiving the radio waves on the reception channels 31 to 34, and the operation of radiating the radio waves from the transmission channels 21 and 22 of the transmitting antenna 10f and receiving the radio waves on the reception channels 31 to 34. At this time, the transmission channels 11 and 12 of the transmitting antenna 10e operate as the first transmitting antenna, and the transmission channels 21 and 22 of the transmitting antenna 10f operate as the second transmitting antenna. Since the positions of the transmitting antenna 10e and the transmitting antenna 10f are different, the phases of the radio waves received by the reception channels 31 to 34 also vary. This enables the MIMO operation using multiple channels for transmission and reception.

Figure 10:
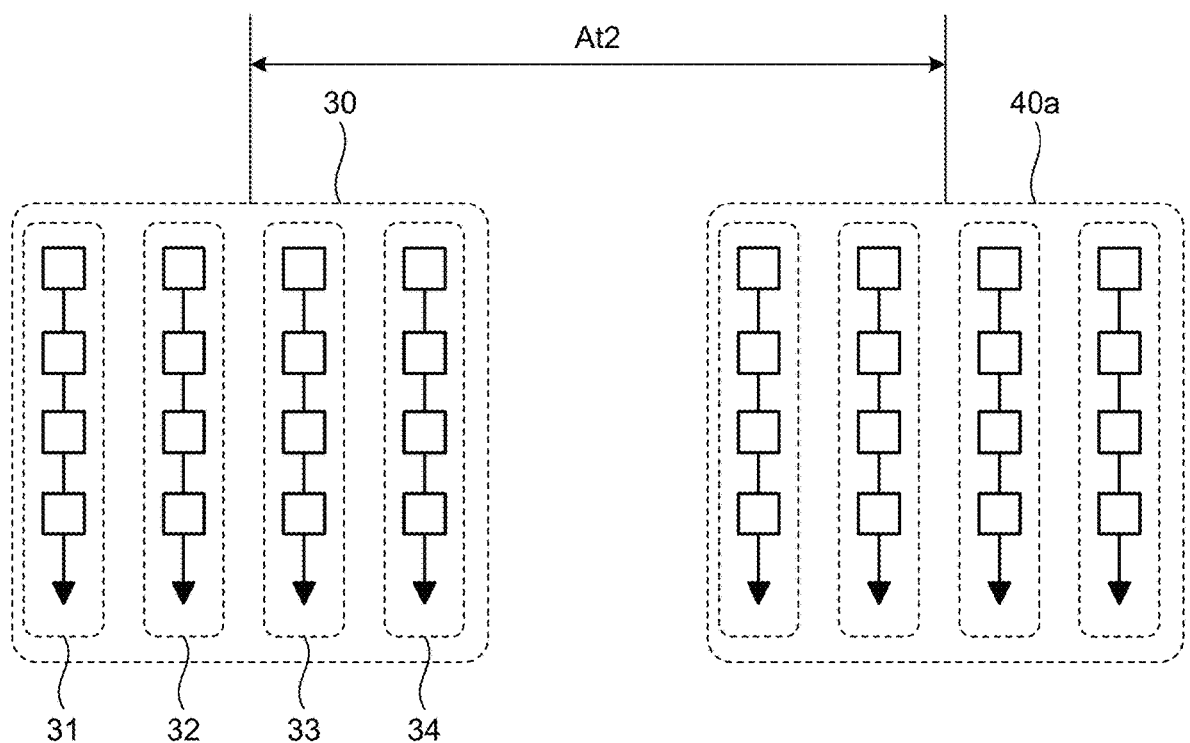
FIG. 10 is a diagram illustrating an equivalent antenna configuration of the antenna device according to the second embodiment in the high resolution mode.

FIG. 10 is a diagram illustrating an equivalent antenna configuration of the antenna device according to the second embodiment in the high resolution mode. With the operation described above, a received signal can be obtained that is equivalent to a case where the receiving antenna 30 and a receiving antenna 40a as a virtual receiving antenna are arranged at the interval "At2" as illustrated in FIG. 10. On the basis of the case where the radio waves are radiated from the transmission channels 11 and 12 and received by the receiving antenna 30, when the radio waves are radiated from the transmission channels 21 and 22 and received by the receiving antenna 30, a phase equivalent to that received by the virtual receiving antenna at the position of the receiving antenna 40a illustrated in FIG. 10 can be obtained. As a result, an effect similar to that of the first embodiment can be obtained.

Note that in the first embodiment, one transmitting antenna includes one transmission channel as illustrated in FIG. 3, whereas in the second embodiment, one transmitting antenna includes two transmission channels as illustrated in FIG. 8. Accordingly, the gain of one transmitting antenna is higher in the second embodiment than in the first embodiment. Therefore, the resolution in the high resolution mode is higher in the second embodiment than in the first embodiment when the interval between the transmitting antennas is the same for the first and second embodiments.

Next, the estimation of the angle of the target 95 during the wide angle mode in the second embodiment will be described. The wide angle mode of the second embodiment includes the operation of radiating the radio wave from the transmission channel 11 of the transmitting antenna 10e and receiving the radio wave on the reception channels 31 to 34, and the operation of radiating the radio wave from the transmission channel 12 of the transmitting antenna 10e and receiving the radio wave on the reception channels 31 to 34. That is, the wide angle mode of the second embodiment uses only the transmitting antenna 10e and does not use the transmitting antenna 10f. At this time, the transmission channel 11 operates as the third transmitting antenna, and the transmission channel 12 operates as the fourth transmitting antenna. Since the positions in the x1 direction of the transmission channel 11 and the transmission channel 12 are different, the phases of the radio waves received by the reception channels 31 to 34 also vary. This enables the MIMO operation using multiple channels for transmission and reception.

A characteristic of the wide angle mode in the second embodiment is that the interval "Dt" between the transmission channel 11 and the transmission channel 12 is narrower than the interval "Dr" between the adjacent reception channels in the receiving antenna 30. Also, FIG. 8 illustrates that the interval "Dt" between the transmission channel 11 and the transmission channel 12 and the interval "Dr" between the adjacent reception channels satisfy the relationship of Dt=Dr/2. Note that the relationship of Dt=Dr/2 is an example, and any relationship satisfying Dt<Dr is included in the scope of the second embodiment.

With the above configuration, as in FIG. 6 used in the description of the first embodiment, the reception channels 31 to 34 included in the receiving antenna 30 and the reception channels included in the virtual receiving antenna 40a are alternately arranged. This results in an equivalent configuration that is the same as or equivalent to the configuration of the first embodiment in which the receiving antenna 30 including the reception channels 31 to 34 and the receiving antenna 40 including the virtual reception channels are arranged so as to be offset by the interval "Dt". Therefore, an effect similar to that of the first embodiment can be obtained.

Moreover, in the wide angle mode of the second embodiment, the radio wave is radiated from only one of the two transmission channels. The radiation pattern within the horizontal plane at this time is as indicated by the broken line in FIG. 9, where the radio wave can be radiated over a wide range by using one transmission channel. As a result, the wide angle performance in the wide angle mode can be maintained while increasing the resolution in the high resolution mode.

Moreover, according to the antenna device of the second embodiment, the wide angle mode and the high resolution mode share the receiving antenna 30 as in the first embodiment and also share a part of the transmission channels. When the high resolution mode is used as a reference, the wide angle mode can be implemented by sharing a part of the transmission channels without providing the transmission channel specific to the wide angle mode as in the first embodiment. This can achieve both higher resolution and wider angle in estimating the angle of a target while preventing or reducing an increase in cost. Moreover, since a part of the transmission channels can be shared, the radar apparatus can be more simplified while keeping down the size of the apparatus as compared with the first embodiment.

Note that in the configuration of FIG. 8, the transmitting antennas 10e and 10f and the receiving antenna 30 only satisfy the relationship of At2>Ar1 between the interval "At2" between the transmitting antennas 10e and 10f and the overall width "Ar1" of the receiving antenna 30, and the pair of the transmitting antennas 10e and 10f and the receiving antenna 30 may have any relative positional relationship with each other.

With the above configuration, as in FIG. 6 used in the description of the first embodiment, the reception channels 31 to 34 included in the receiving antenna 30 and the reception channels included in the virtual receiving antenna 40 are alternately arranged. This results in the configuration that is the same as or equivalent to the configuration of the first embodiment in which the receiving antenna 30 including the reception channels 31 to 34 and the receiving antenna 40 including the virtual reception channel are arranged so as to be offset by the interval "Dt". Therefore, an effect similar to that of the first embodiment can be obtained.

Moreover, in the second embodiment, the wide angle mode uses the transmission channels 11 and 12 of the transmitting antenna 10e, but instead of the transmitting antenna 10e, the transmission channels 21 and 22 of the transmitting antenna 10f may be used to radiate the radio waves. However, it goes without saying that in the transmitting antenna 10f, the interval between the transmission channel 21 and the transmission channel 22 needs to be narrower than the interval "Dr" between the adjacent reception channels in the receiving antenna 30.

Third Embodiment

Figure 11:
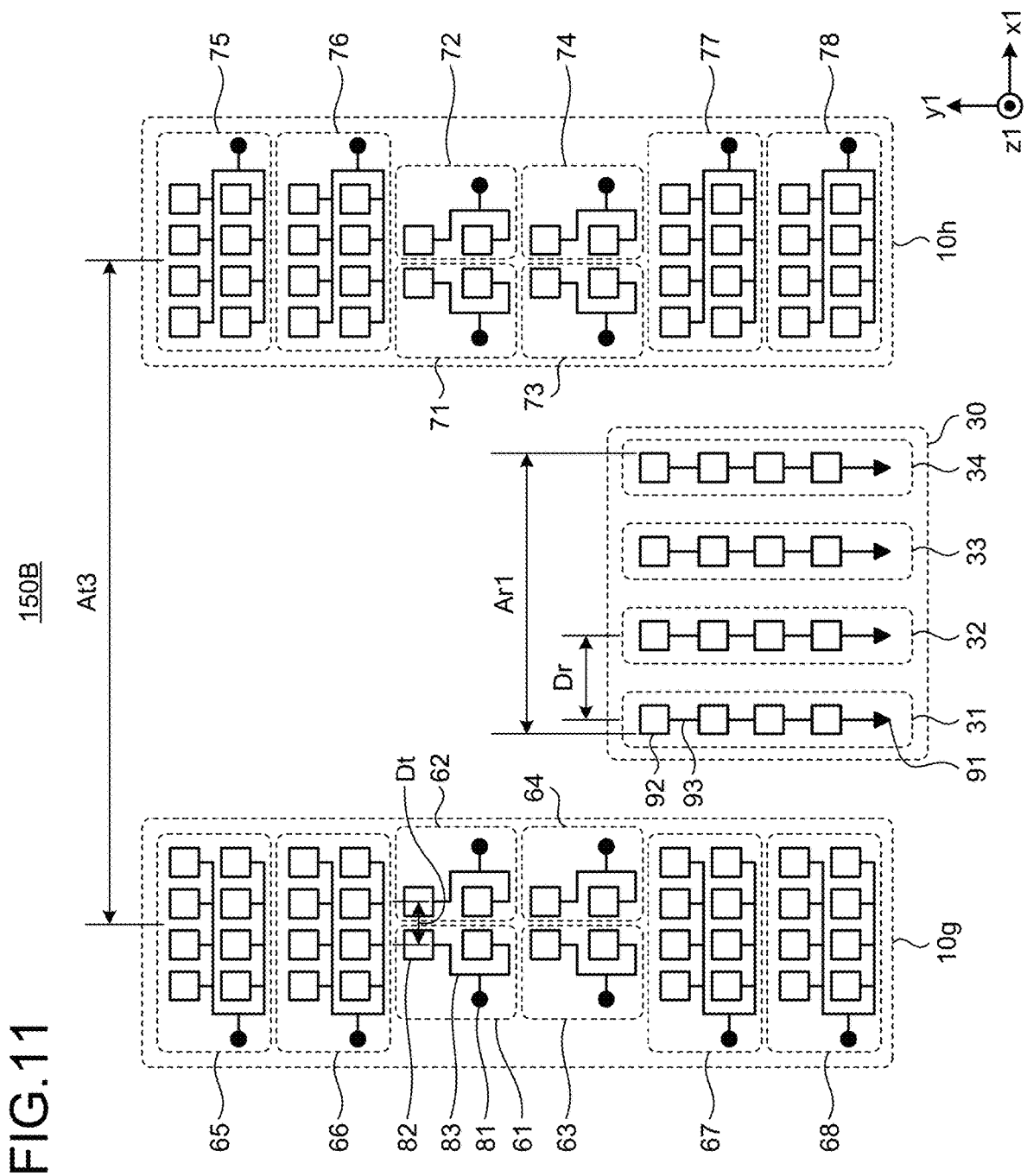
FIG. 11 is a diagram illustrating an example of the arrangement of element antennas in an antenna device according to a third embodiment.

FIG. 11 is a diagram illustrating an example of the arrangement of element antennas in an antenna device according to a third embodiment. An antenna device 150B according to the third embodiment in FIG. 11 is obtained by replacing the transmitting antennas 10e and 10f of the antenna device 150A according to the second embodiment illustrated in FIG. 8 with transmitting antennas 10g and 10h, respectively.

The transmitting antenna 10g is provided with eight transmission channels 61 to 68, and the transmitting antenna 10h is provided with eight transmission channels 71 to 78. The configuration of each transmission channel will be described later.

Note that the other configurations are identical or equivalent to those of the second embodiment and are thus denoted by the same reference numerals as those in the second embodiment, whereby a redundant description will be omitted. Moreover, in the following description, the transmission channels 61, 62, 63, 64, 71, 72, 73, and 74 will be in some cases referred to as a "first transmission channel", a "second transmission channel", a "third transmission channel", a "fourth transmission channel", a "fifth transmission channel", a "sixth transmission channel", a "seventh transmission channel", and an "eighth transmission channel", respectively. Furthermore, in the following description, one or a plurality of the transmission channels 65 to 68 will be in some cases collectively referred to as a "ninth transmission channel", and at least one or a plurality of the transmission channels 75 to 78 will be in some cases collectively referred to as a "tenth transmission channel".

An additional description will be made of the configuration in FIG. 11. In FIG. 11, the transmitting antenna 10g and the transmitting antenna 10h are arranged at the interval wider than the overall width "Ar1" of the receiving antenna 30, as in the second embodiment. However, since the configurations of the transmitting antennas 10g and 10h are different from those of the second embodiment, the interval is indicated by "At3" in FIG. 11. The transmission channels in each of the transmitting antennas 10g and 10h transmit the same radio wave at the same time, so that the interval "At3" corresponds to the distance between the phase center of the transmitting antenna 10g and the phase center of the transmitting antenna 10h.

Moreover, in FIG. 11, the configurations of the transmission channels 61, 63, 71, and 73 are the same, the configurations of the transmission channels 62, 64, 72, and 74 are the same, and the configurations of the transmission channels 65 to 68 and 75 to 78 are the same. The transmission channels 61, 63, 71, and 73 and their respective transmission channels 62, 64, 72, and 74 are symmetrical with respect to the axis in the y1 direction, and the transmission channels 65 to 68 and their respective transmission channels 75 to 78 are symmetrical with respect to the axis in the y1 direction.

Moreover, in FIG. 11, each of the transmission channels 61 to 64 and 71 to 74 includes two of the element antennas 82 arranged in a line along the y1 direction, and each of the transmission channels 65 to 68 and 75 to 78 includes eight of the element antennas 82 arranged in four lines along the x1 direction and two lines along the y1 direction.

That is, each of the transmission channels 61 to 64 and 71 to 74 includes the two element antennas 82 arranged in the y1 direction and connected to the corresponding feeding point 81 via the corresponding lines 83, thereby forming a sub-array antenna including the two element antennas 82.

Moreover, in each of the transmission channels 65 to 68 and 75 to 78, the four element antennas 82 are arranged in the x1 direction and connected together via the corresponding lines 83 to form a four-element antenna group, and two lines of four-element antenna group are arranged in the y1 direction and connected to the corresponding feeding point 81, thereby forming a sub-array antenna including the total of eight element antennas 82.

In the configuration of FIG. 11, the number of the element antennas 82 in each of the transmission channels 61 to 64 and 71 to 74 is two but need only be two or more (N elements, where N is an integer of two or more), and the number of the element antennas 82 in each of the transmission channels 65 to 68 and 75 to 78 is eight but need only be two or more (M elements, where M is an integer of two or more). Note that M is preferably larger than N.

Note that the configuration of each transmission channel illustrated in FIG. 11 is an example. The number of the element antennas 82, the direction of arrangement thereof, the order of arrangement of the transmission channels in each of the transmitting antennas 10g and 10h, and the like may be set to any number or in any way matching the performance of the radar apparatus.

Moreover, in the transmitting antenna 10g of FIG. 11, as a preferable example of the arrangement, the pair of the transmission channels 61 and 62, the pair of the transmission channels 63 and 64, and the transmission channels 65 to 68 are arranged such that the positions of the respective phase centers coincide along the axis in the x1 direction. A similar arrangement is also preferred for the transmitting antenna 10h.

Note that in the following description, instead of the above definition, the transmission channels 61, 62, 71, and 72 will be in some cases referred to as a "first transmission sub-array antenna", a "second transmission sub-array antenna", a "third transmission sub-array antenna", and a "fourth transmission sub-array antenna", respectively. Moreover, the transmission channels 63, 64, 73, and 74 will be in some cases referred to as a "fifth transmission sub-array antenna", a "sixth transmission sub-array antenna", a "seventh transmission sub-array antenna", and an "eighth transmission sub-array antenna", respectively. Furthermore, the transmission channels 65, 66, 67, 68, 75, 76, 77, and 78 will be in some cases referred to as a "ninth transmission sub-array antenna", a "tenth transmission sub-array antenna", an "eleventh transmission sub-array antenna", a "twelfth transmission sub-array antenna", a "thirteenth transmission sub-array antenna", a "fourteenth transmission sub-array antenna", a "fifteenth transmission sub-array antenna", and a "sixteenth transmission sub-array antenna", respectively.

Next, the operation of the antenna device 150B according to the third embodiment will be described. As with the first and second embodiments, the antenna device 150B according to the third embodiment includes two operation modes, i.e., the high resolution mode and the wide angle mode.

First, the high resolution mode in the third embodiment will be described. The high resolution mode uses the transmission channels 61 to 68 and 71 to 78 and the reception channels 31 to 34.

In FIG. 11, the radio wave radiated from each of the transmission channels 61 to 68 is reflected by the target 95 and received by the reception channels 31 to 34 of the receiving antenna 30. The radio wave radiated from each of the transmission channels 71 to 78 is also reflected by the target 95 and received by the reception channels 31 to 34 of the receiving antenna 30.

In the high resolution mode, the radio waves are transmitted by alternately switching at least the transmission channels 66 and 67 and the transmission channels 76 and 77. In the wide angle mode, the radio waves are transmitted by alternately switching the transmission channel 61 or 63 and the transmission channel 62 or 64 in adjacent first and second frequency chirp periods. Then, the radio waves are transmitted by alternately switching the transmission channel 71 or 73 and the transmission channel 72 or 74 in adjacent third and fourth frequency chirp periods. These processings are performed according to a control sequence preset by the mode switching unit 340 or a mode control signal from the outside (not shown).

The signal processor 330 of the radar apparatus 300 performs signal processing for estimating the distance, speed, and angle of the target 95 on the basis of a digitized signal of the high frequency signal obtained at the receiving point 91. Note that as described above, since a known technique is used for estimating the distance and speed of the target 95, the description thereof will be omitted here.

Next, the estimation of the angle of the target 95 during the high resolution mode in the third embodiment will be described. The high resolution mode of the third embodiment includes the operation of simultaneously radiating the radio wave from each of the transmission channels 61 to 68 of the transmitting antenna 10g and receiving the radio waves on the reception channels 31 to 34, and the operation of simultaneously radiating the radio wave from each of the transmission channels 71 to 78 of the transmitting antenna 10h and receiving the radio waves on the reception channels 31 to 34. At this time, the transmission channels 61 to 64 of the transmitting antenna 10g operate as the first transmitting antenna, and the transmission channels 71 to 74 of the transmitting antenna 10h operate as the second transmitting antenna. Since the positions of the transmitting antenna 10g and the transmitting antenna 10h are different, the phases of the radio waves received by the reception channels 31 to 34 also vary. This enables the MIMO operation using multiple channels for transmission and reception.

Figure 12:
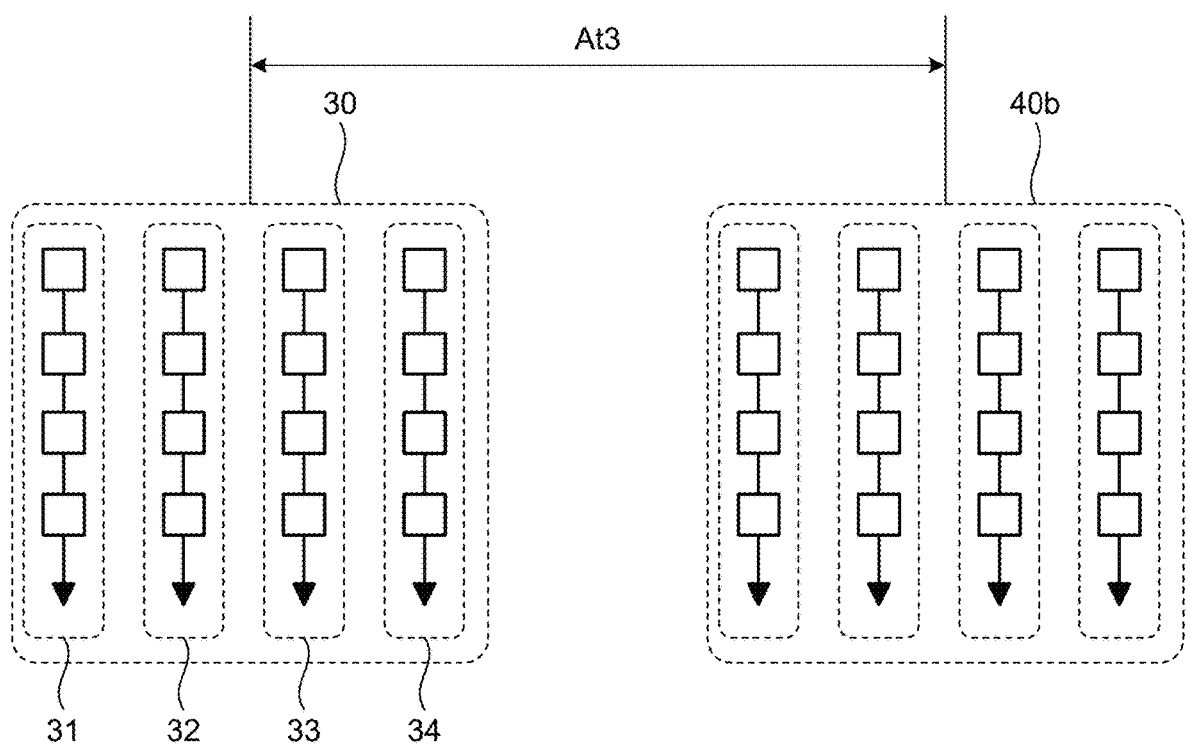
FIG. 12 is a diagram illustrating an equivalent antenna configuration of the antenna device according to the third embodiment in the high resolution mode.

FIG. 12 is a diagram illustrating an equivalent antenna configuration of the antenna device according to the third embodiment in the high resolution mode. With the operation described above, a received signal can be obtained that is equivalent to a case where the receiving antenna 30 and a receiving antenna 40b as a virtual receiving antenna are arranged at the interval "At3" as illustrated in FIG. 12. On the basis of the case where the radio waves are radiated from the transmission channels 61 to 68 and received by the receiving antenna 30, when the radio waves are radiated from the transmission channels 71 to 78 and received by the receiving antenna 30, a phase equivalent to that received by the virtual receiving antenna at the position of the receiving antenna 40b illustrated in FIG. 12 can be obtained. As a result, an effect similar to that of the second embodiment can be obtained.

Note that in the second embodiment, one transmitting antenna includes two transmission channels as illustrated in FIG. 8, whereas in the third embodiment, one transmitting antenna includes eight transmission channels as illustrated in FIG. 11. Accordingly, the gain of one transmitting antenna is higher in the third embodiment than in the second embodiment. Therefore, the resolution in the high resolution mode is higher in the third embodiment than in the second embodiment. Note that in the configuration of the third embodiment, the number of transmission channels per transmitting antenna is not limited to eight. An even number of four or more transmission channels may be included per transmitting antenna as long as the high resolution mode and the wide angle mode can be implemented.

Next, the estimation of the angle of the target 95 during the wide angle mode in the third embodiment will be described. The wide angle mode of the third embodiment includes the operation of radiating the radio waves from the transmission channels 61 and 63 of the transmitting antenna 10*g* and receiving the radio waves on the reception channels 31 to 34, and the operation of radiating the radio waves from the transmission channels 62 and 64 of the transmitting antenna 10*g* and receiving the radio waves on the reception channels 31 to 34. That is, the wide angle mode of the third embodiment uses only the transmitting antenna 10*g* and does not use the transmitting antenna 10*h*. At this time, the transmission channels 61 and 63 operate as the third transmitting antenna, and the transmission channels 62 and 64 operate as the fourth transmitting antenna. Since the positions in the x1 direction of the transmission channels 61 and 63 and the transmission channels 62 and 64 are different, the phases of the radio waves received by the reception channels 31 to 34 also vary. This enables the MIMO operation using multiple channels for transmission and reception.

A characteristic of the wide angle mode in the third embodiment is that the interval "Dt" between the pair of the transmission channels 61 and 63 and the pair of the transmission channels 62 and 64 is narrower than the interval "Dr" between the adjacent reception channels in the receiving antenna 30. Also, FIG. 11 illustrates that the interval "Dt" between the pair of the transmission channels 61 and 63 and the pair of the transmission channels 62 and 64 and the interval "Dr" between the adjacent reception channels satisfy the relationship of Dt=Dr/2. Note that the relationship of Dt=Dr/2 is an example, and any relationship satisfying Dt<Dr is included in the scope of the third embodiment.

The above configuration corresponds to the configuration similar to that of FIG. 6 used in the description of the first embodiment. Specifically, the reception channels 31 to 34 included in the receiving antenna 30 and reception channels included in the virtual receiving antenna 40*b* are alternately arranged. This results in the equivalent configuration that is the same as or equivalent to the configuration of the first and second embodiments in which the receiving antenna 30 including the reception channels 31 to 34 and the receiving antenna 40*b* including the virtual reception channels are arranged so as to be offset by the interval "Dt". Therefore, an effect similar to that of the first and second embodiments can be obtained.

Moreover, according to the antenna device of the third embodiment, the wide angle mode and the high resolution mode share the receiving antenna 30 as in the first embodiment and also share a part of the transmission channels. When the high resolution mode is used as a reference, the wide angle mode can be implemented by sharing a part of the transmission channels without providing the transmission channel specific to the wide angle mode as in the first embodiment. This can achieve both higher resolution and wider angle in estimating the angle of a target while preventing or reducing an increase in cost. Moreover, since a part of the transmission channels can be shared, the radar apparatus can be more simplified while keeping down the size of the apparatus as compared with the first embodiment.

Moreover, in the antenna device according to the third embodiment, with respect to some of the transmission channels located at different positions in the vertical direction, a transmission channel is arranged at the interval "Dt" that is narrower than the interval "Dr" between the adjacent channels of the reception channels 31 to 34. Specifically, in the transmitting antenna 10*g*, the transmission channels 61, 63, and 65 to 68 are located at different positions along an axis in the vertical direction. Among these, with respect to the transmission channel 61, the transmission channel 62 is arranged so as to be offset by the interval "Dt" in the horizontal direction. With respect to the transmission channel 63, the transmission channel 64 is arranged so as to be offset by the interval "Dt" in the horizontal direction. Meanwhile, the transmission channels 65 to 68 each do not have another transmission channel arranged at the position of the interval "Dt". In the case of this example, in the high resolution mode, the beamwidth in the vertical direction is relatively narrow because all the transmission channels included in the transmitting antenna 10*g* are used. On the other hand, in the wide angle mode, the beamwidth in the vertical direction is relatively wide because the transmission channels 61 to 64 are used. Therefore, the beamwidth in the vertical direction can be changed depending on the operation mode. Here, the transmitting antenna 10*g* has been described, but the transmitting antenna 10*h* can also be operated similarly.

Moreover, according to the antenna device of the third embodiment, the radio waves can be simultaneously radiated by the transmission channels 61 to 68 and 71 to 78 arranged in the vertical direction. When the total output power is constant, the power per transmission channel can be reduced by using the plurality of transmission channels. This can reduce the required output of an IC (not shown) connected to each transmission channel, and an amplifier of the IC can be made simple.

Note that in the configuration of FIG. 11, the transmitting antennas 10*g* and 10*h* and the receiving antenna 30 only satisfy the relationship of At3>Ar1 between the interval "At3" between the transmitting antennas 10*g* and 10*h* and the overall width "Ar1" of the receiving antenna 30, and the pair of the transmitting antennas 10*g* and 10*h* and the receiving antenna 30 may have any relative positional relationship with each other.

Moreover, in the third embodiment, the wide angle mode uses the transmission channels 61 to 64 of the transmitting antenna 10*g*, but instead of the transmitting antenna 10*g*, the transmission channels 71 to 74 of the transmitting antenna 10*h* may be used to radiate the radio waves. However, it goes without saying that in the transmitting antenna 10*h*, the interval between the pair of the transmission channels 71 and 73 and the pair of the transmission channels 72 and 74 needs to be narrower than the interval "Dr" between the adjacent reception channels in the receiving antenna 30.

Furthermore, in the configuration of FIG. 11, the transmission channels 61 to 68 and 71 to 78 included in the respective transmitting antennas 10*g* and 10*h* are located at different positions in the vertical direction, so that the beam direction in the vertical direction can be changed by giving a phase difference to the radio wave transmitted by each transmission channel. The angle of the target 95 in the vertical direction can be estimated as a result.

The following is an example of beam scanning in the vertical direction in the configuration of FIG. 11. The transmission switched to any one or two of the transmission channels 61 and 63 and the transmission switched to any one or two of the transmission channels 62 and 64 are alternately switched. Alternatively, the transmission switched to any one or two of the transmission channels 71 and 73 and the transmission switched to any one or two of the transmission channels 72 and 74 are alternately switched. Yet alternatively, the transmission switched to any one or a plurality of the transmission channels 61 to 68 and the transmission switched to any one or a plurality of the transmission channels 71 to 78 are alternately switched.

Note that when the beam direction in the vertical direction does not need to be changed or when the beam in the vertical direction does not need to be narrowed, only the transmission channels 61 to 64 and 71 to 74 may be used without using the transmission channels 65 to 68 and 75 to 78.

Figure 13:
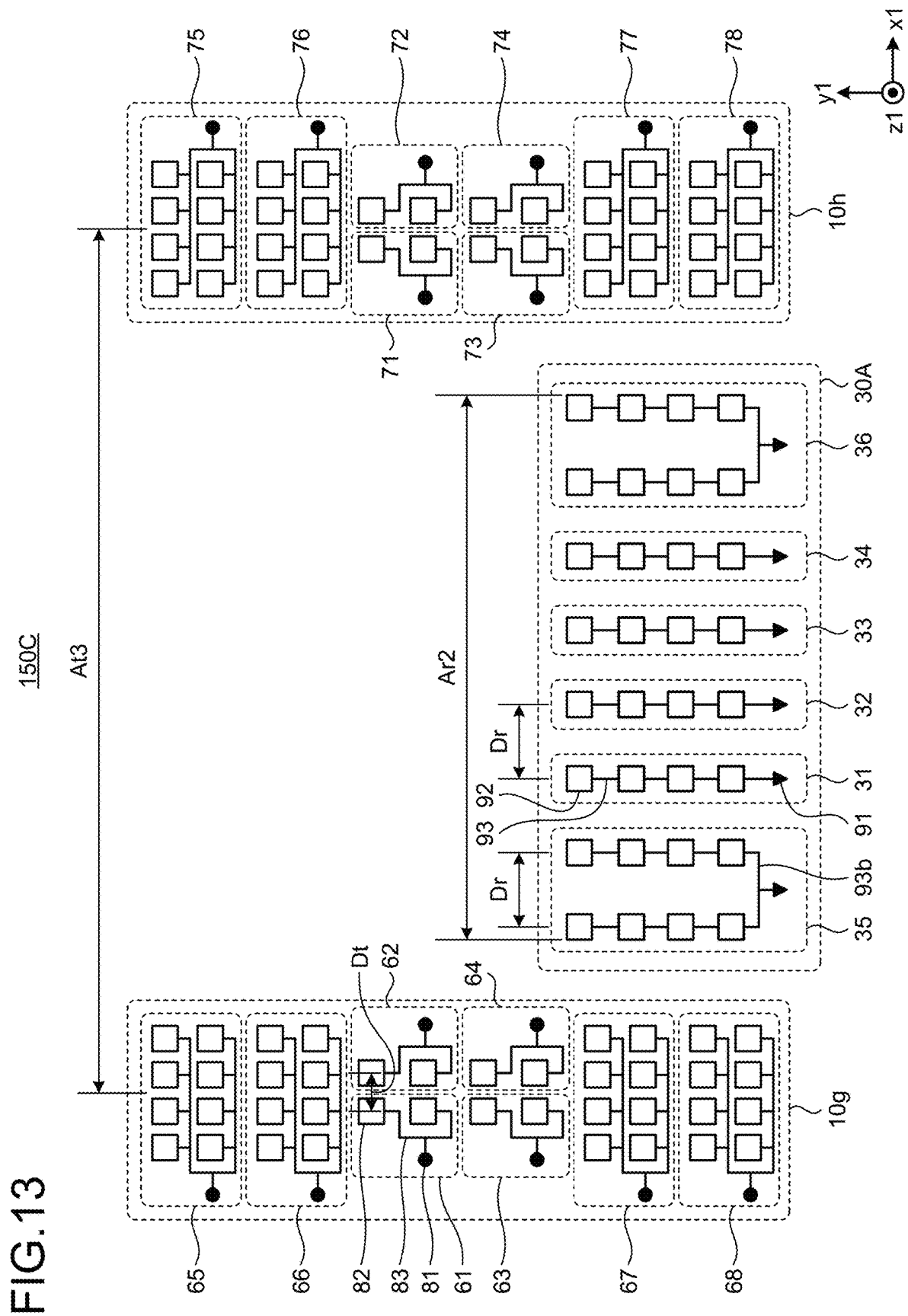
FIG. 13 is a diagram illustrating a variation of the antenna device according to the third embodiment.

The antenna device 150B according to the third embodiment illustrated in FIG. 11 may also be configured as in FIG. 13. FIG. 13 is a diagram illustrating a variation of the antenna device according to the third embodiment.

An antenna device 150C according to the variation of the third embodiment in FIG. 13 is obtained by replacing the receiving antenna 30 of the antenna device 150B according to the third embodiment illustrated in FIG. 11 with a receiving antenna 30A. In the receiving antenna 30A, reception channels 35 and 36 are added in addition to the reception channels 31 to 34. The reception channel 35 includes two reception channels each having the same configuration as the reception channel 31. The one and the other reception channels are arranged at the same interval as the interval "Dr" between the adjacent channels of the reception channels 31 to 34, and are connected by a line 93b to have one receiving point. The reception channel 36 has a similar configuration. Moreover, the configurations of the transmitting antennas 10g and 10h are the same as those of FIG. 11, and the same components are denoted by the same reference numerals so that a redundant description will be omitted.

The reception channel 35 is adjacent to the reception channel 31 and is arranged in the negative x1 direction relative thereto. The reception channel 36 is adjacent to the reception channel 34 and is arranged in the positive x1 direction relative thereto. The reception channels 31 and 35 and the reception channels 34 and 36 are each arranged at any interval such that the overall width of the receiving antenna 30A is "Ar2". The relationship of At3>Ar2 between the interval "At3" between the transmitting antennas 10g and 10h and the overall width "Ar2" of the receiving antenna 30A is the same as that in the configuration of FIG. 11. The interval "At3" may be increased when the reception channels 35 and 36 do not fit between the transmitting antenna 10g and the transmitting antenna 10h due to the size of the reception channels 35 and 36.

Figure 14:
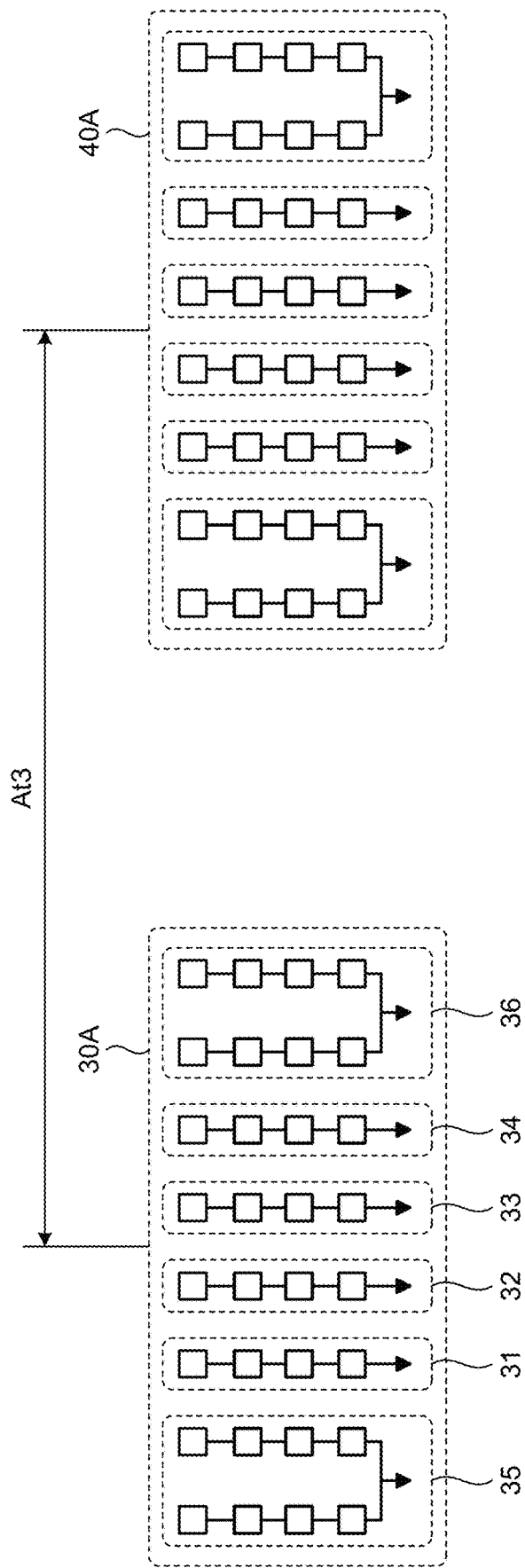
FIG. 14 is a diagram illustrating an equivalent antenna configuration of the antenna device according to the variation of the third embodiment in the high resolution mode.

The operation in the high resolution mode is basically the same as that of the configuration illustrated in FIG. 11. FIG. 14 is a diagram illustrating an equivalent antenna configuration of the antenna device according to the variation of the third embodiment in the high resolution mode. A received signal obtained is equivalent to that in a case where the receiving antenna 30A and a receiving antenna 40A, which is a virtual receiving antenna, are arranged at the interval "At3" as illustrated in FIG. 14. On the basis of the case where the radio waves are radiated from the transmission channels 61 to 68 and received by the receiving antenna 30A, when the radio waves are radiated from the transmission channels 71 to 78 and received by the receiving antenna 30A, a phase equivalent to that received by the virtual receiving antenna at the position of the receiving antenna 40A illustrated in FIG. 14 can be obtained. As a result, an effect similar to that of the second and third embodiments can be obtained.

The operation in the wide angle mode is also basically the same as that of the configuration illustrated in FIG. 11. Note that in the wide angle mode, unlike the high resolution mode, processing may be performed using a part of the reception channels. The reception channels 31 to 34 are used here.

In FIG. 13, when the reception channels 31 to 34 are used as the receiving antenna to perform the MIMO operation with the transmission by the transmission channels 61 and 63 and the transmission by the transmission channels 62 and 64, the configuration of the virtual reception channels is the same as that of FIG. 6. That is, the relative positional relationship between the receiving antenna 30A and the virtual receiving antenna 40A is the same as that in the first embodiment. As a result, the effect of the third embodiment described above can be obtained.

Fourth Embodiment

Figure 15:
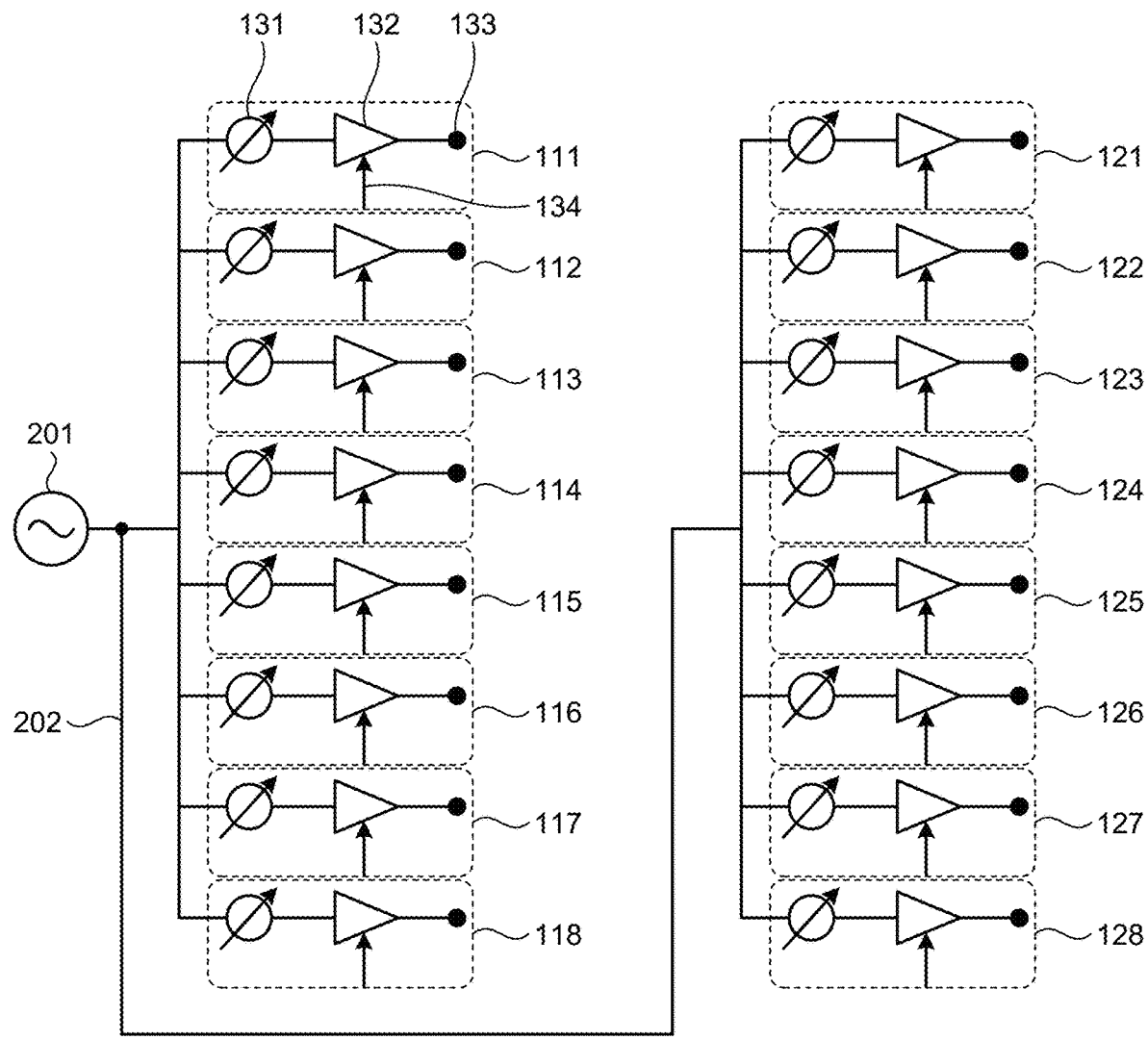
FIG. 15 is a diagram illustrating an example of a configuration of a high frequency circuit used in the radar apparatus illustrated in FIG. 1.

In a fourth embodiment, a high frequency circuit used in the radar apparatus illustrated in FIG. 1 will be described. FIG. 15 is a diagram illustrating an example of a configuration of the high frequency circuit used in the radar apparatus illustrated in FIG. 1. However, FIG. 15 illustrates only the configuration of a part connected to each of the transmitting antennas 10g and 10h.

In FIG. 15, a high frequency circuit 200 includes an oscillator 201 and sixteen transmitters 111 to 118 and 121 to 128. The oscillator 201 forms the voltage controlled oscillator 304 of FIG. 1.

The transmitter 111 includes a phase shifter 131, an amplifier 132, an output terminal 133, and a control line 134. The transmitters 112 to 118 and 121 to 128 each also have a similar configuration to the transmitter 111. The eight transmitters 111 to 118 correspond in number to the transmission channels 61 to 68 in FIG. 11, and the eight transmitters 121 to 128 correspond in number to the transmission channels 71 to 78 in FIG. 11. The output terminal 133 of the transmitter 111 is connected to the feeding point 81 of the transmission channel 61 in FIG. 11. The output terminals 133 of the transmitters 112 to 118 and 121 to 128 are also connected to the feeding points 81 of the corresponding transmission channels as in the case of the transmitter 111. The transmitters 111 to 118 and 121 to 128 form the high frequency transmission circuit 600 of FIG. 1. Moreover, as for the power distributor 306 of FIG. 1, a part of the configuration is simply illustrated by a line 202.

Next, the operation of the high frequency circuit 200 in the fourth embodiment will be described.

The oscillator 201 produces a high frequency signal. The high frequency signal produced by the oscillator 201 is distributed to the transmitters 111 to 118 and 121 to 128 via the line 202. At this time, the frequency of the oscillator 201 may be set to 1/N (N is an integer), and a multiplier may be provided in each transmitter to output an N-fold frequency.

The mode switching unit 340 of the signal processor 330 generates transmission control information including phase control information of the phase shifter 131 and output control information of the amplifier 132 corresponding to each mode in accordance with the MIMO operation in the high resolution mode and the MIMO operation in the wide angle mode, and transmits the transmission control information to the DA converter 327. The DA converter 327 performs digital-to-analog conversion on the phase control information to obtain a phase control signal, and performs digital-to-analog conversion on the output control information to obtain an output control signal.

The phase shifter 131 adjusts the phase of the high frequency signal on the basis of the phase control signal of the transmission control signal from the DA converter 327. The amplifier 132 amplifies the power of the high frequency signal on the basis of the output control signal of the transmission control signal from the DA converter 327. The high frequency signal output from the amplifier 132 is transmitted to the element antenna 82 via the output terminal 133 and the feeding point 81 of each transmission channel, whereby radio waves are radiated from the element antennas 82.

The phase of the high frequency signal is adjusted by the phase shifter 131 in the above operation, whereby the direction of the antenna beam in the vertical direction can be changed. This enables angle measurement in the vertical direction. Note that in the above description, the antenna device is caused to perform the phased array operation when performing angle measurement in the horizontal direction, but the phased array operation can also be performed in the vertical direction by changing the direction of the antenna beam in the vertical direction.

The control line 134 switches on and off the output of the high frequency signal from the transmitters 111 to 118 and 121 to 128.

First, in the high resolution mode, when the radio waves are radiated from the transmitting antenna 10g of FIG. 11, the transmitters 111 to 118 are turned on, and the transmitters 121 to 128 are turned off. When the radio waves are radiated from the transmitting antenna 10h of FIG. 11, the transmitters 111 to 118 are turned off, and the transmitters 121 to 128 are turned on.

In the wide angle mode, when the radio waves are radiated from the transmission channels 61 and 63 of the transmitting antenna 10g of FIG. 11, the transmitters 111 and 113 are turned on, and the other transmitters are turned off. When the radio waves are radiated from the transmission channels 62 and 64 of the transmitting antenna 10g, the transmitters 112 and 114 are turned on, and the other transmitters are turned off.

As described above, the use of the high frequency circuit 200 of the fourth embodiment can implement the MIMO operation in the high resolution mode and the MIMO operation in the wide angle mode simply by turning on or off the transmitters.

Note that although the operation of turning on or off the transmitters has been described above, the output power of the transmitter turned on may be adjusted. By adjusting the output power of the transmitter, the beamwidth, beam direction, and the like can be finely controlled.

Figure 16:
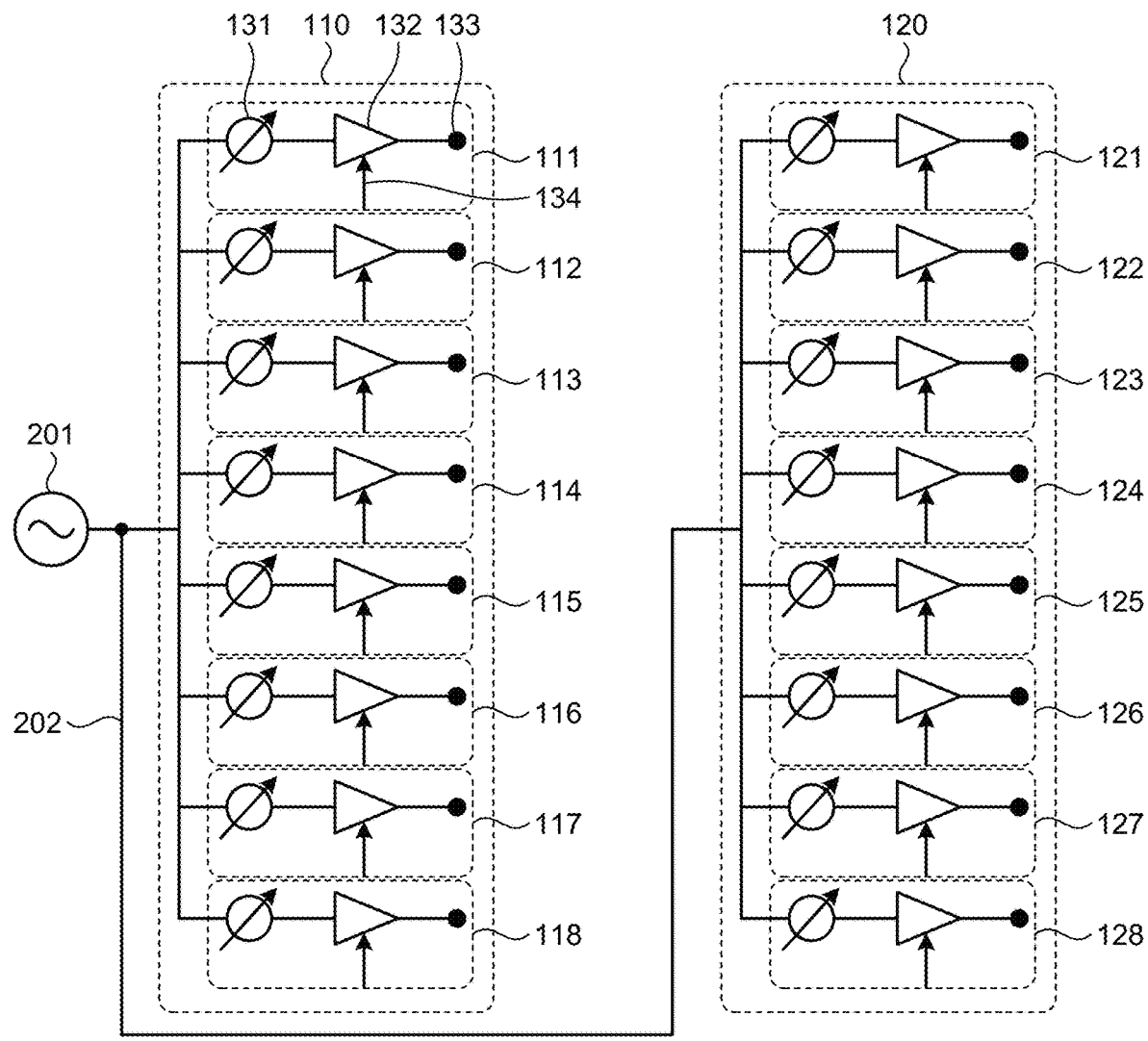
FIG. 16 is a diagram illustrating another example of the configuration of the high frequency circuit illustrated in FIG. 15.

The high frequency circuit 200 of FIG. 15 may also be configured as in FIG. 16. FIG. 16 is a diagram illustrating another example of the configuration of the high frequency circuit 200 illustrated in FIG. 15.

A high frequency circuit 200A illustrated in FIG. 16 includes an IC 110 and an IC 120. According to FIG. 16, the transmitters 111 to 118 are installed on the IC 110, and the transmitters 121 to 128 are installed on the IC 120. In the case of the configuration of FIG. 16, each transmission channel can be operated in the wide angle mode and the high resolution mode by turning on and off the transmitters in the IC.

Note that in FIG. 16, all the transmitters connected to the transmission channels 61 to 68 in the transmitting antenna 10g are included in the IC 110, and all the transmitters connected to the transmission channels 71 to 78 in the transmitting antenna 10h are included in the IC 120, but the configuration of the high frequency circuit is not limited to this configuration. For example, all the transmitters connected to the transmission channels 61 to 68 and 71 to 78 may be included in one IC. The IC may be an existing IC.

On the contrary, for example, the transmitters connected to the transmission channels 61 to 68 and 71 to 78 may be divided into several groups, and an IC may be included for each group. In the case of the configuration in FIG. 11, for example, the transmitters can be divided into six groups. A first group is a group of the transmitters connected to the transmission channels 61 and 63, a second group is a group of the transmitters connected to the transmission channels 62 and 64, a third group is a group of the transmitters connected to the transmission channels 65 to 68, a fourth group is a group of the transmitters connected to the transmission channels 71 and 73, a fifth group is a group of the transmitters connected to the transmission channels 72 and 74, and a sixth group is a group of the transmitters connected to the transmission channels 75 to 78. This grouping allows each transmission channel to operate in the wide angle mode and the high resolution mode by turn-on and off on a per IC basis.

Fifth Embodiment

Figure 17:
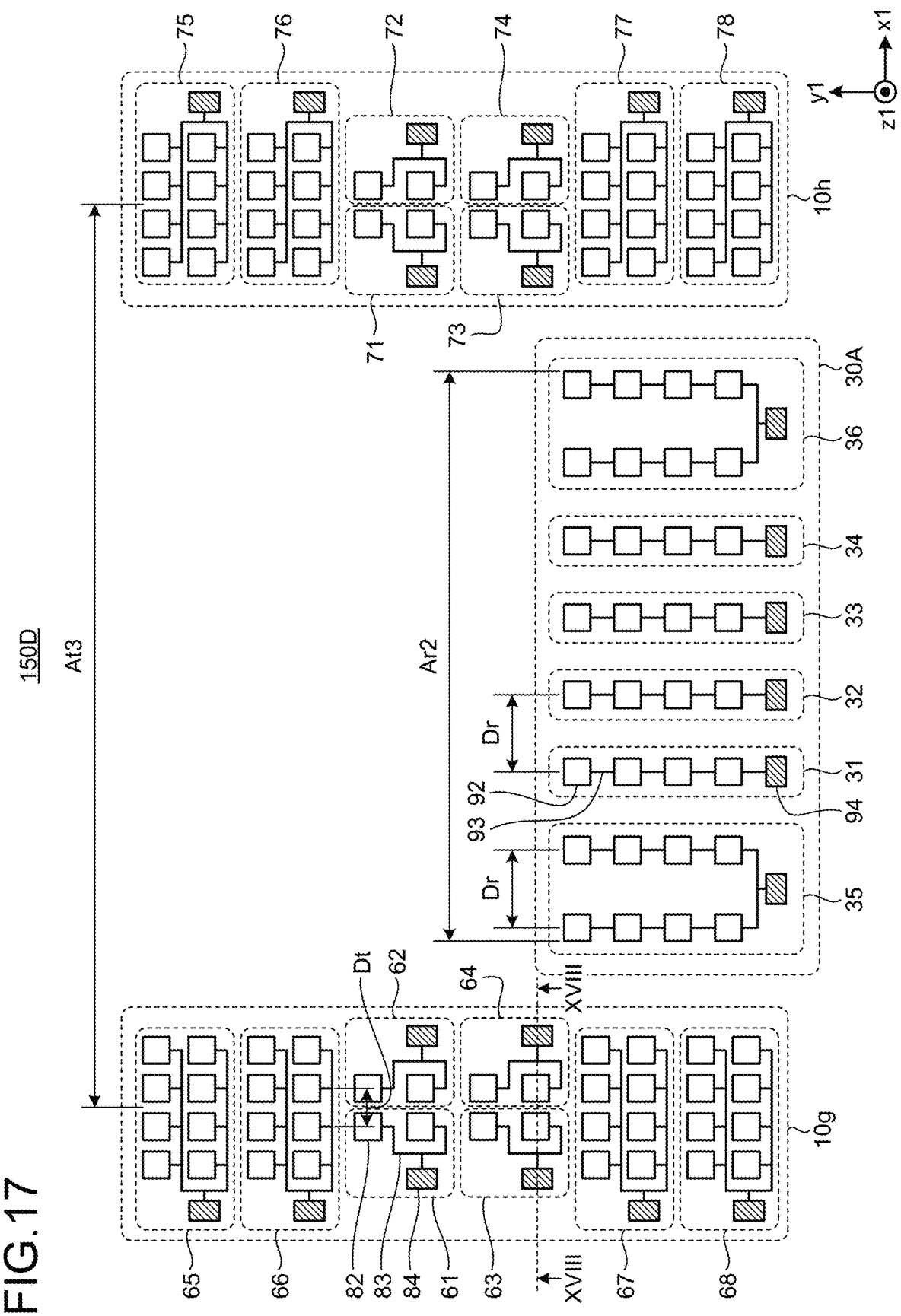
FIG. 17 is a diagram illustrating an example of arrangement of element antennas in an antenna device according to a fifth embodiment.

FIG. 17 is a diagram illustrating an example of the arrangement of element antennas in an antenna device according to a fifth embodiment. An antenna device 150D according to the fifth embodiment in FIG. 17 is obtained by replacing the feeding points 81 and the reception points 91 of the antenna device 150C according to the third embodiment illustrated in FIG. 13 with converters 84 and 94, respectively. The converters 84 in FIG. 17 are one of forms in which the feeding points 81 in FIG. 13 are implemented. The converters 94 in FIG. 17 are one of forms in which the reception points 91 in FIG. 13 are implemented. Thus, electrical operations of the antenna device 150D illustrated in FIG. 17 are the same as those of the antenna device 150C illustrated in FIG. 13. Note that the components that are the same as or equivalent to those in the third embodiment are denoted by the same reference numerals, and a redundant description thereof will be omitted as appropriate.

Figure 18:
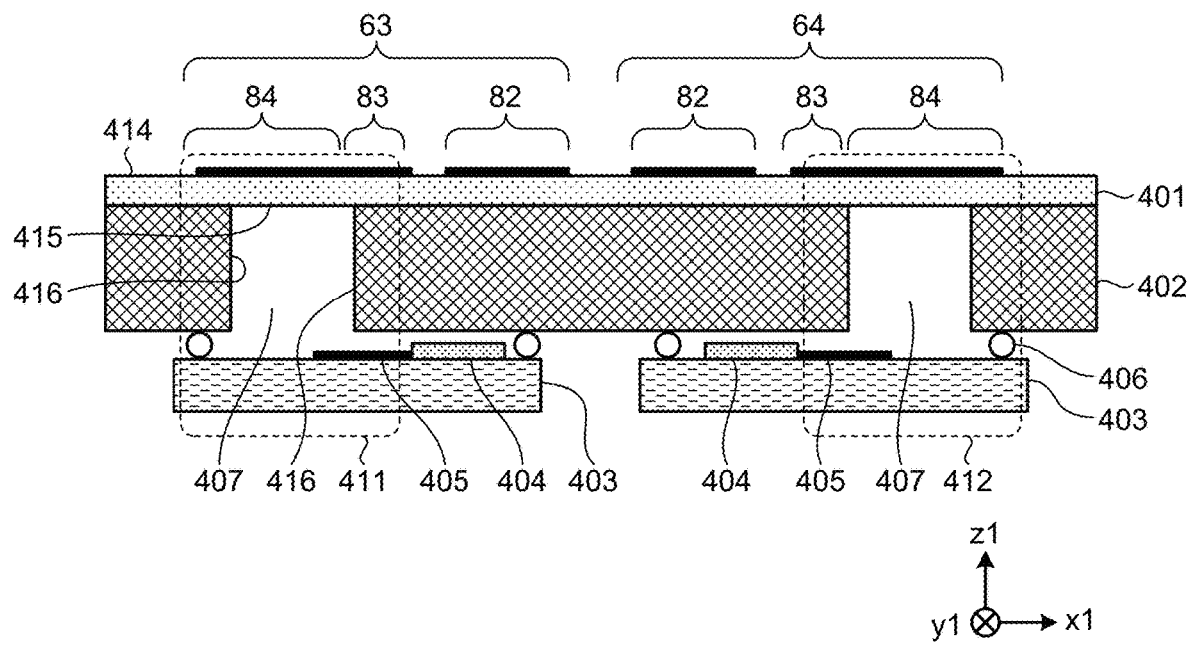
FIG. 18 is a cross-sectional view illustrating a first example of a configuration of a substrate on which the antenna device according to the fifth embodiment is mounted.

FIG. 18 is a cross-sectional view illustrating a first example of a configuration of a substrate on which the antenna device according to the fifth embodiment is mounted. FIG. 18 illustrates the example of the configuration of the substrate and a cross section structure along line XVIII-XVIII illustrated in FIG. 17. The element antennas of any of the antenna devices presented above including that of FIG. 17 are disposed on a first face 414 of an antenna substrate 401 in FIG. 18. A first substrate 402 that provides circuit wiring abuts directly on a second face 415, which is a back face opposite to the first face 414 of the antenna substrate 401, or the first substrate 402 is joined indirectly to the second face 415 through bonding material. Examples of the bonding material include an adhesive agent and an adhesive sheet. Formed through the first substrate 402 is a plurality of apertures 407 through which radio frequency signals pass. The apertures 407 extend in a z1 direction, which is a third direction. The apertures 407 are defined by the first face 414 of the antenna substrate 401, two inner faces 416 in the first substrate 402, and other two inner faces not illustrated in FIG. 18. These inner faces have conductor films formed through, for example, metal plating thereon at least.

Second substrates 403 are disposed away from the first substrate 402 in the negative z1 direction. FIG. 18 illustrates an example of a configuration in which a second substrate 403 is included for each transmission channel, and the two second substrates 403 are disposed in correspondence the transmission channels 63 and 64.

An IC 404 that generates a radio frequency signal is mounted on each of the second substrates 403. Specifically, the ICs 404 are installed on the faces of the second substrates 403 on the side of the first substrate 402. An example of circuits of the ICs 404 is any one of the transmitters 111 to 118 and 121 to 128 in FIG. 15. A radio frequency signal from an IC 404 is transmitted to a line 405 formed on a second substrate 403. The first substrate 402 and the second substrates 403 are connected with each other by solder balls 406, which are an example of conductive connection members. Note that the number of solder balls 406 may be any number, and the solder balls 406 may be disposed as necessary between the first substrate 402 and the second substrates 403 for conduction of radio frequency signals, power supply, conduction of control signals, and the like.

The apertures 407 are present between the lines 83 connected to the element antennas 82 and the ICs 404 that generate radio frequency signals, and serve as transmission spaces for waveguides transmitting the radio frequency signals. Waveguides are tubes for propagation of waves of electromagnetic fields in a waveguide mode (TE mode or TM mode) in the traveling direction. In the fifth embodiment, a plurality of quadrangular holes are formed in the substrate to form a plurality of rectangular waveguides for propagation of waves of the electromagnetic fields in the third direction, which is the normal direction to the substrate. Note that the shape of tubular cross sections of the waveguides may be a cross-sectional shape other than a rectangle, such as a cocoon-like shape combining semicircles on both short sides of a rectangle, for example.

Radio frequency connection units 411 and 412 illustrated by broken lines refer to structural parts for transmitting radio frequency signals from the lines 405 to the lines 83 via the apertures 407. The radio frequency connection units 411 and 412 constitute converters (waveguide-microstrip converters) that convert waves of the electromagnetic fields between a waveguide mode and a microstrip mode. The second substrates 403 may have converters formed therein for use in the conversion from the lines 405 into the apertures 407. The conversion from the apertures 407 to the lines 83 is performed by the converters 84 formed in the antenna substrate 401. One form of the converters 84 is conductor patterns formed on the surface of the antenna substrate 401. Matching circuits, which are not illustrated, are connected to the conductor patterns to achieve a structure preventing leakage of radio waves in mode conversion from the waveguide mode to the microstrip mode. Note that the converters 84 are not limited to conductor patterns, and may be implemented in any manner.

Note that the aperture 407 is formed on a per transmission-channel basis. In the description below, the apertures 407 formed in the transmission channels 61 to 68 may be referred to as a "first aperture", a "second aperture", a "third aperture", a "fourth aperture", a "fifth aperture", a "sixth aperture", a "seventh aperture", and an "eighth aperture", respectively. In addition, to distinguish between a conductor pattern connected to an element antenna 82 and a conductor pattern connected to an IC 404, the former may be referred to as a "first conductor pattern", and the latter may be referred to as a "second conductor pattern".

A first feature of the fifth embodiment is that the element antennas 82 of a plurality of transmission channels are disposed on the same face, i.e., the first face 414 of the antenna substrate 401. A second feature of the fifth embodiment is that the apertures 407 for transmitting radio frequency signals to transmission channels adjacent to each other are located outside with respect to line XVIII-XVIII connecting the associated element antennas 82 of these transmission channels when the second face 415 of the antenna substrate 401 is viewed in the z1 direction. Note that the apertures 407 may be, in other words, the radio frequency connection units 411 and 412. Specifically, the radio frequency connection unit 411 of the transmission channel 63 and the radio frequency connection unit 412 of the transmission channel 64 are located outside with respect to line XVIII-XVIII connecting the associated element antennas 82 of these transmission channels when the second face 415 of the antenna substrate 401 is viewed in the z1 direction.

Consequently, the presence of the radio frequency connection units 411 and 412 eliminates the constraint on the arrangement of the element antennas 82, which enables the element antennas 82 of the present invention to be easily disposed as discussed above. In particular, the channel intervals between the transmission channels 61 and 62, between the transmission channels 63 and 64, between the transmission channels 71 and 72, and between the transmission channels 73 and 74 are narrow. Thus, the configuration of the fifth embodiment that eliminates the constraint on the arrangement of the element antennas 82 facilitates the arrangement.

Note that mounting the ICs 404 near the positions of the converters 84 in FIG. 17 could provide a similar configuration. In this case, the ICs 404 should be disposed on the same face as the element antennas, and a large number of wires (not illustrated) for, for example, power supply of the ICs 404, and control lines should be also provided on the same face as the element antennas, but such wiring would be difficult. In addition, to prevent unwanted radiation of radio waves from the ICs 404, shield structures are provided for the ICs 404 in some cases. A large number of such shield structures are needed in order to avoid the element antennas 82 that radiate necessary radio waves, and the manufacture is thus difficult. In contrast, the fifth embodiment does not pose such problems because the ICs 404 are mounted on the opposite face to the face on which the element antennas are disposed.

While the description has been made as to the transmission channels, the reception channels, which are provided with the converters 94 in FIG. 17, can provide a structure similar to that of FIG. 18. In this case, the ICs 404 are replaced with those provided for reception.

While an example of the waveguide structure having the apertures 407 formed in the first substrate 402 has been presented above as a structure for allowing millimeter waves to pass therethrough, other structures may be used. For example, the apertures 407 may be replaced with coaxial structures, and the converters on the second substrates 403 and the antenna substrate 401 may be replaced with line-coaxial converters.

Figure 19:
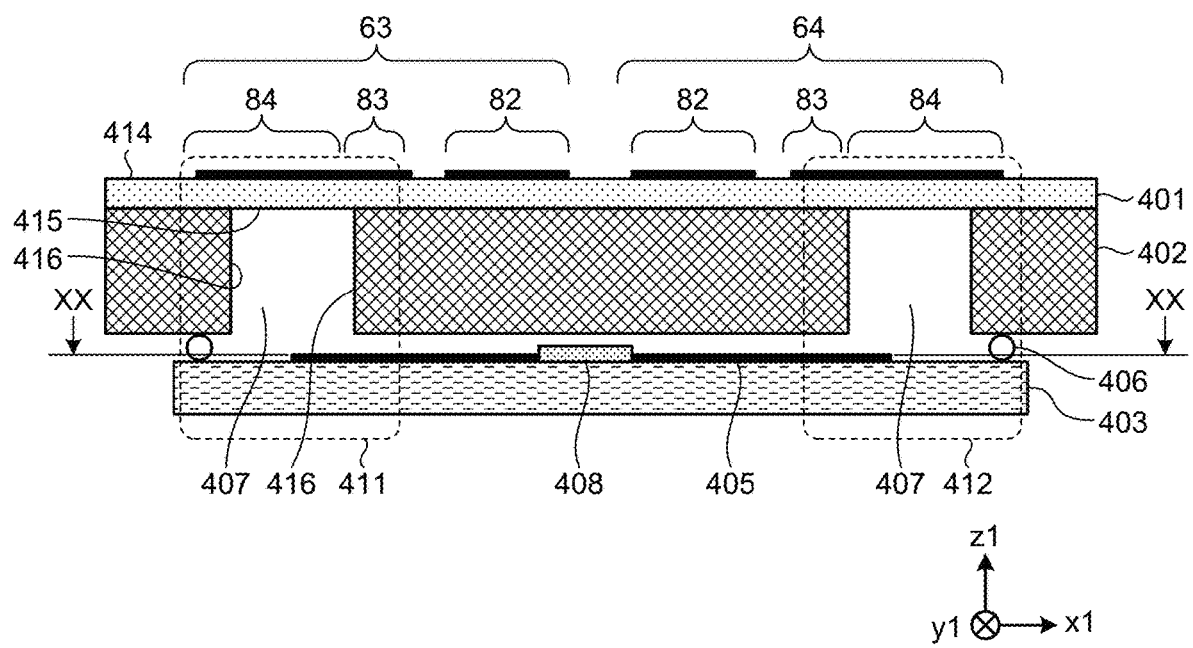
FIG. 19 is a cross-sectional view illustrating a second example of a configuration of a substrate on which the antenna device according to the fifth embodiment is mounted.

FIG. 19 is a cross-sectional view illustrating a second example of a configuration of a substrate on which the antenna device according to the fifth embodiment is mounted. FIG. 19 illustrates an example of a cross section structure along line XVIII-XVIII illustrated in FIG. 17, which is different form the example of FIG. 18. FIG. 19 differs from FIG. 18 in that the number of second substrates 403 is one and that an IC 408 is mounted instead of the ICs 404. While the ICs 404 each generate radio frequency signals for one transmission channel, the IC 408 generates radio frequency signals for two transmission channels. Thus, the essential difference between FIG. 18 and FIG. 19 is whether or not the ICs are integrated, and the operations are the same in both cases.

According to the configurations in FIGS. 17 to 19, a plurality of waveguides are formed in the first substrate 402, one end of each of the waveguides is disposed facing or in an opposed relation to, the second face of the antenna substrate 401, and a waveguide microstrip converter is formed between the first conductor pattern and the waveguide. In addition, at least a waveguide connected to the transmission channel 61 and another waveguide connected to the transmission channel 63 are disposed at different positions from each other. Alternatively, at least a waveguide connected to the transmission channel 62 and another waveguide connected to the transmission channel 64 are disposed at different positions from each other. The other end of each of the waveguides is disposed in an opposed relation to the other end of the second conductor pattern. The waveguides, which are present between the first conductor patterns and the ICs 404 or the IC 408, transmit radio frequency signals.

Figure 20:
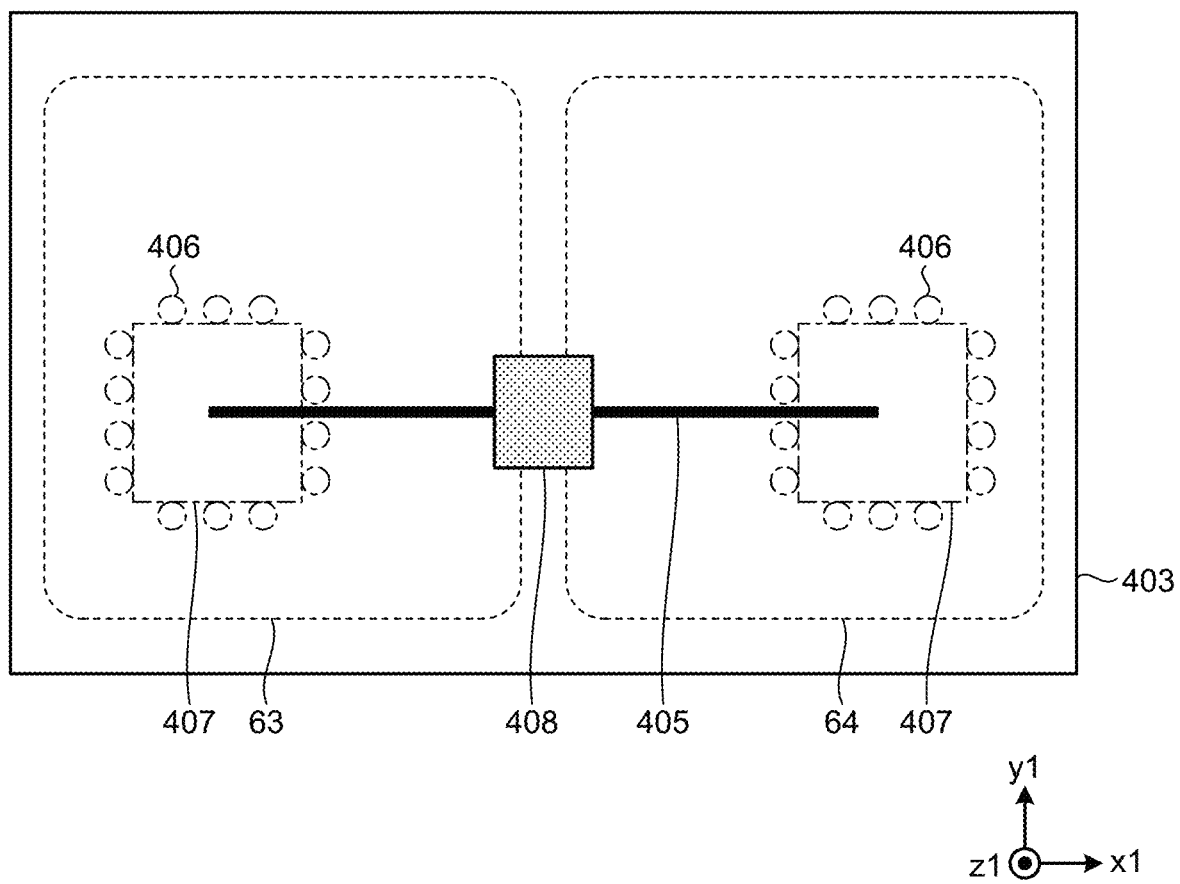
FIG. 20 is a first cross-sectional view of a second substrate along line XX-XX in the second example of the configuration illustrated in FIG. 19.

FIG. 20 is a first cross-sectional view of the second substrate 403 along line XX-XX in the second example of the configuration illustrated in FIG. 19. Note that FIG. 20 illustrates an extract of part corresponding to the transmission channels 63 and 64 in FIG. 17. In FIG. 20, broken lines indicate ranges in which the transmission channels 63 and 64 in FIG. 17 are present. In addition, alternate long and short dash lines indicate ranges in which the apertures 407 in FIG. 19 are formed. As illustrated in FIG. 20, the combination of the aperture 407 of the transmission channel 63 and the aperture 407 of the transmission channel 64 is formed along the x1 direction, which is the first direction.

There are four features of the configuration illustrated in FIG. 20. The first feature is that the IC 408 generates radio frequency signals for the two transmission channels 63 and 64. The second feature is that the IC 408 is disposed on a substrate different from the antenna substrate 401. The third feature is that the apertures 407 corresponding to the two transmission channels 63 and 64 associated with the IC 408 are formed not on the side of the adjacent channels but on the side opposite the adjacent channels. The fourth feature is that the solder balls 406, which are conductive connection members, are arranged at intervals of $\lambda/4$ in such a manner as to surround the apertures 407. Note that "$\lambda$" is an operating wavelength of the reception antenna 40 in the millimeter band.

As a result, even in the case where the IC 408 generates radio frequency signals for two transmission channels, the radio frequency connection units 411 and 412 can be provided avoiding the element antennas 82, and the connection between the IC 408 and each of the transmission channels 63 and 64 can be easily achieved. In addition, because the solder balls 406 are arranged around the apertures 407 at intervals of $\lambda/4$, leakage of the electromagnetic fields from the apertures 407 that serve as the waveguides can be reduced.

While the connection between the IC 408 and each of the transmission channels 63 and 64 is described above, needless to say, similar connections can also be achieved for the transmission channels 61 and 62.

Note that one may consider mounting the IC 408 near the position of a converter 84 in FIG. 17. In the case of the IC 408 being mounted at the position of the converter 84 in the transmission channel 64, for example, the element antennas 82 and the line 83 of the transmission channel 64 are present near the IC 408, and it is thus difficult to connect the IC 408 with the element antennas 82 of the transmission channel 63.

That is to say, there is the same problem as discussed in the above case where the ICs 404 are arranged on the same face as the element antennas.

Figure 21:
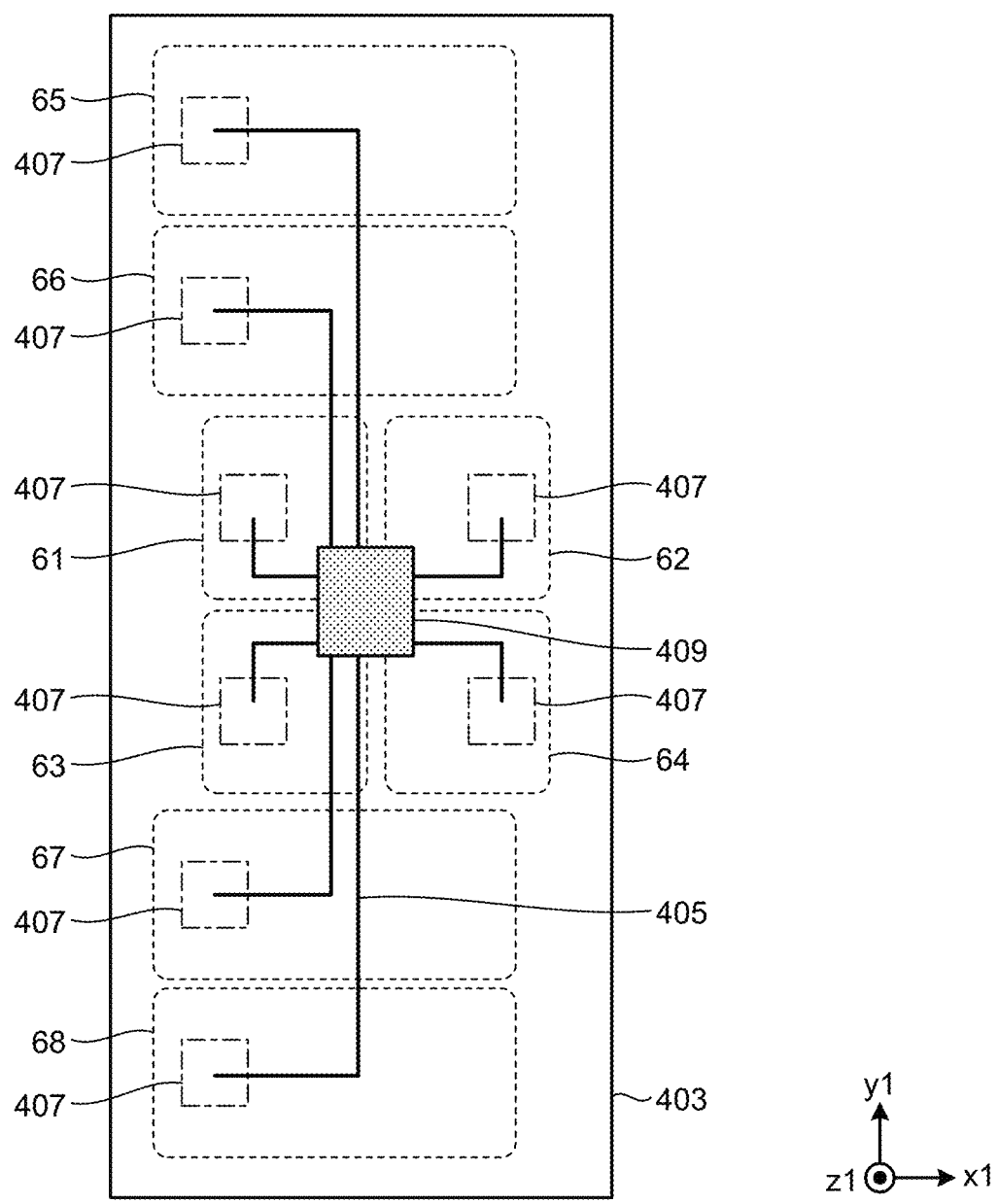
FIG. 21 is a second cross-sectional view of the second substrate along line XX-XX in the second example of the configuration illustrated in FIG. 19.

FIG. 21 is a second cross-sectional view of the second substrate 403 along line XX-XX in the second example of the configuration illustrated in FIG. 19. Note that FIG. 21 illustrates an extract of part corresponding to the transmission channels 61 to 68 in FIG. 17. In FIG. 21, broken lines indicate ranges in which the transmission channels 61 to 68 in FIG. 17 are present. In addition, alternate long and short dash lines indicate ranges in which apertures of the transmission channels 61 to 68 are formed. As illustrated in FIG. 21, a combination of the aperture 407 of the transmission channel 61 and the aperture 407 of the transmission channel 63, a combination of the aperture 407 of the transmission channel 62 and the aperture 407 of the transmission channel 64, a combination of the aperture 407 of the transmission channel 65 and the aperture 407 of the transmission channel 66, and a combination of the aperture 407 of the transmission channel 67 and the aperture 407 of the transmission channel 68 are formed along the y1 direction, which is the second direction.

An IC 409 is connected to the transmission channels 61 to 68 via lines 405. An example of the circuit of the IC 409 is the IC 110 or the IC 120 in FIG. 16.

There are three features in the configuration illustrated in FIG. 21. The first feature is that the IC 409 generates radio frequency signals for the eight transmission channels 61 and 68. The second feature is that the IC 409 is disposed on a substrate different from the antenna substrate 401. The third feature is that the apertures 407 corresponding to each of the combination of the transmission channels 63 and 64 and the combination of the transmission channels 61 and 62, among the four transmission channels 61 to 64 associated with the IC 409, are formed not on the side of the adjacent channels but on the side opposite the adjacent channels.

As a result, individual radio frequency connection units can be arranged avoiding the element antennas 82, and the connection between the IC 409 and each of the combination of the transmission channels 63 and 64 and the combination of the transmission channels 61 and 62 can be easily achieved.

While the arrangement of the radio frequency connection units of each of the combination of the transmission channels 63 and 64 and the combination of the transmission channels 61 and 62 has been described above with reference to FIG. 21, the IC 409 is also connected to the transmission channels 65 to 68 in addition to the transmission channels 61 to 64. As illustrated in FIG. 17, the converters 84 of the transmission channels 65 to 68 and the radio frequency connection units (not illustrated) associated with the converters 84 may be disposed without interfering with the element antennas 82 of the transmission channels.

As a result, even in the case where the IC 409 generates radio frequency signals for eight transmission channels 61 to 68, the radio frequency connection units of the transmission channels 61 to 68 can be disposed avoiding the element antennas 82, and the connections between the IC 409 and the individual transmission channels 61 to 68 can be easily achieved.

Note that the configurations presented in the embodiments above are examples of the present invention, and can be combined with other known technologies or can be partly omitted or modified without departing from the scope of the present invention.

REFERENCE SIGNS LIST 10, 10a, 10b, 10c, 10d, 10e, 10f, 10g, 10h transmission antenna; 11, 12, 21, 22, 41, 42, 61 to 68, 71 to 78 transmission channel; 30, 30A, 40, 40a, 40b, 40A reception antenna; 31 to 36 reception channel; 81 feeding point; 82, 92 element antenna; 83, 93, 93b, 202, 405 line; 84, 94 converter; 91 reception point; 95 target; 96 transmission wave; 97 reflected wave; 110, 120, 404, 408, 409 IC; 111 to 118, 121 to 128 transmitter; 131 phase shifter; 132 amplifier; 133 output terminal; 134 control line; 150, 150A, 150B, 150C, 150D antenna device; 200, 200A radio frequency circuit; 201 oscillator; 300 radar device; 302 transmitting unit; 304 voltage control oscillator; 306 power divider; 320 receiving unit; 323 baseband amplifier; 324 mixer; 326 AD converter; 327 DA converter; 330 signal processor; 340 mode switching unit; 350 modulation circuit; 401 antenna substrate; 402 first substrate; 403 second substrate; 406 solder ball; 407 aperture; 411, 412 radio frequency connection unit; 414 first face; 415 second face; 416 inner face; 500 processor; 502 memory; 504 interface; 600 radio frequency frequency transmission circuit.

The invention claimed is:

1. An antenna device comprising:
an antenna substrate having a first face, the first face having disposed thereon:
a first plurality of element antennas connected to first, second, third, and fourth transmission channels,
first conductor patterns connected to the first plurality of element antennas, and
a second plurality of element antennas connected to a plurality of reception channels;
a first substrate abutting directly on a second face of the antenna substrate or joined indirectly to the second face of the antenna substrate via a bonding material, the second face of the antenna substrate being a back face opposite to the first face of the antenna substrate; and
one or more second substrates electrically connected with the first substrate via a plurality of conductive connection members between the one or more second substrates and a second face of the first substrate which is opposite to a first face of the first substrate abutting directly on or joined indirectly to the antenna substrate, each of the one or more second substrates having at least one integrated circuit mounted on a first face thereof, the first faces of the one or more second substrates facing the first substrate, the integrated circuits generating radio frequency signals, the one or more second substrates having second conductor patterns formed on the first faces thereof, the second conductor patterns each having one end connected to a corresponding one of the integrated circuits, wherein
a plurality of waveguides are in the first substrate, and each of the plurality of waveguides has one end and another end, the one end of each of the plurality of waveguides facing or opposed to the second face of the antenna substrate and forming a waveguide microstrip converter between a corresponding one of the first conductor patterns and the waveguide, the other end of each of the plurality of waveguides being opposed to another end of a corresponding one of the second conductor patterns,
the plurality of waveguides include at least a first waveguide connected to the first transmission channel, a third waveguide connected to the third transmission channel, a second waveguide connected to the second transmission channel, and a fourth waveguide connected to the fourth transmission channel,
the first waveguide connected to the first transmission channel and the third waveguide connected to the third transmission channel are located at different positions from each other, or the second waveguide connected to the second transmission channel and the fourth waveguide connected to the fourth transmission channel are located at different positions from each other,
the plurality of waveguides are between the first conductor patterns and the integrated circuits to transmit the radio frequency signals,
in a side sectional view of the antenna device each said at least one integrated circuit is entirely between a pair of radio frequency converters respectfully associated the third transmission channel and the fourth transmission channel, and
in the side sectional view of the antenna device at least one of the first element antennas associated with the third transmission channel and at least one of the first element antennas associated with the fourth transmission channel are entirely between the pair of radio frequency converters.

2. The antenna device according to claim 1, wherein each of the plurality of waveguides includes an aperture that extends entirely through the first substrate from the first face of the first substrate to the second face of the first substrate, the aperture including an inner face covered by metal plating.

3. The antenna device according to claim 1, wherein
at least two of the first plurality of antennas are arranged along a line in a first direction, and
the at least two of the first plurality of antennas are separated from the plurality of waveguides in the first direction.

4. The antenna device according to claim 1, wherein
at least two of the first plurality of antennas are arranged along a line in a first direction,
each of the at least two of the first plurality of antennas has a corresponding waveguide in the plurality of waveguides, and
the at least two of the first plurality of antennas are arranged closer to each other in the first direction than the corresponding waveguides.

5. The antenna device according to claim 1, wherein each of the plurality of waveguides is a tube for propagation of the radio frequency signals.

6. The antenna device according to claim 1, wherein
a plurality of apertures each extends entirely through the first substrate from the first face of the first substrate to the second face of the first substrate, and
the plurality of apertures are individually provided on a per transmission-channel basis.

7. The antenna device according to claim 1, wherein
of the plurality of waveguides, the third waveguide is associated with the third transmission channel and the fourth waveguide is associated with the fourth transmission channel,
each of the plurality of waveguides includes an aperture that extends entirely through the first substrate from the first face of the first substrate to the second face of the first substrate, and
in the side sectional view of the antenna device, each said at least one integrated circuit, at least one of the first element antennas associated with the third transmission channel, and at least one of the first element antennas associated with the fourth transmission channel are inward of the apertures respectively associated with third and fourth waveguides.

8. An antenna device comprising:
an antenna substrate having a first face, the first face having disposed thereon:
plural sets of a first plurality of element antennas respectively connected to first, second, third, and fourth transmission channels,
plural sets of first conductor patterns respectively connected to the first element antennas, and
plural sets of a second plurality of element antennas respectively connected to a plurality of reception channels;
a first substrate abutting directly on a second face of the antenna substrate or joined indirectly to the second face of the antenna substrate via a bonding material, the second face of the antenna substrate being a back face opposite to the first face of the antenna substrate; and
one or more second substrates electrically connected with the first substrate via a plurality of conductive connection members between the one or more second substrates and a second face of the first substrate which is opposite to a first face of the first substrate abutting directly on or joined indirectly to the antenna substrate, each of the one or more second substrates having at least one integrated circuit mounted on a first face thereof, the first faces of the one or more second substrates facing the first substrate, the integrated circuits generating radio frequency signals, the one or more second substrates having second conductor patterns formed on the first faces thereof, the second conductor patterns each having one end connected to a corresponding one of the integrated circuits, wherein
a plurality of waveguides are in the first substrate, and each of the plurality of waveguides has one end and another end, the one end of each of the plurality of waveguides facing or opposed to the second face of the antenna substrate and forming a waveguide microstrip converter between a corresponding one of the first conductor patterns and the waveguide, the other end of each of the plurality of waveguides being opposed to another end of a corresponding one of the second conductor patterns,
the plurality of waveguides include at least a first waveguide connected to the first transmission channel, a third waveguide connected to the third transmission channel, a second waveguide connected to the second transmission channel, and a fourth waveguide connected to the fourth transmission channel,
the first waveguide connected to the first transmission channel and the third waveguide connected to the third transmission channel are located at different positions from each other, or the second waveguide connected to the second transmission channel and the fourth waveguide connected to the fourth transmission channel are located at different positions from each other,
in a side sectional view of the antenna device each said at least one integrated circuit is entirely between a pair of converters respectfully associated the third transmission channel and the fourth transmission channel, each of the converters being configured to convert waves of electromagnetic fields between a waveguide mode and a microstrip mode, and
in the side sectional view of the antenna device at least one of the first element antennas associated with the third transmission channel and at least one of the first element antennas associated with the fourth transmission channel are entirely between the pair of converters.

9. The antenna device according to claim 8, wherein
each of the plurality of waveguides includes an aperture that extends entirely through the first substrate from the first face of the first substrate to the second face of the first substrate, the aperture including an inner face covered by metal plating.

10. The antenna device according to claim 8, wherein
at least two of the first plurality of antennas are arranged along a line in a first direction, and
the at least two of the first plurality of antennas are separated from the plurality of waveguides in the first direction.

11. The antenna device according to claim 8, wherein
at least two of the first plurality of antennas are arranged along a line in a first direction,
each of the at least two of the first plurality of antennas has a corresponding waveguide in the plurality of waveguides, and
the at least two of the first plurality of antennas are arranged closer to each other in the first direction than the corresponding waveguides.

12. The antenna device according to claim 8, wherein each of the plurality of waveguides is a tube for propagation of the radio frequency signals.

13. The antenna device according to claim 8, wherein
a plurality of apertures each extends entirely through the first substrate from the first face of the first substrate to the second face of the first substrate, and
the plurality of apertures are individually provided on a per transmission-channel basis.

14. The antenna device according to claim 8, wherein
of the plurality of waveguides, the third waveguide is associated with the third transmission channel and the fourth waveguide is associated with the fourth transmission channel,
each of the plurality of waveguides includes an aperture that extends entirely through the first substrate from the first face of the first substrate to the second face of the first substrate, and
in the side sectional view of the antenna device, each said at least one integrated circuit, at least one of the first element antennas associated with the third transmission channel, and at least one of the first element antennas associated with the fourth transmission channel are inward of the apertures respectively associated with third and fourth waveguides.

* * * * *